US010310667B2

(12) United States Patent
Gourevitch et al.

(10) Patent No.: US 10,310,667 B2
(45) Date of Patent: Jun. 4, 2019

(54) MULTI-BAR CAPACITIVE SENSE ELECTRODE

(71) Applicant: Apple Inc., Cupertino, CA (US)

(72) Inventors: Alexandre Gourevitch, San Jose, CA (US); Albert Lin, Cupertino, CA (US); Isaac Chan, Sunnyvale, CA (US); Martin Paul Grunthaner, Los Altos Hills, CA (US); Prathit Bugnait, Sunnyvale, CA (US); Seyed Mohammad Navidpour, San Jose, CA (US); Sumant Ranganathan, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/860,364

(22) Filed: Sep. 21, 2015

(65) Prior Publication Data
US 2017/0083152 A1  Mar. 23, 2017

(51) Int. Cl.
*G06F 3/044* (2006.01)
*G06F 3/041* (2006.01)
*G06F 3/0354* (2013.01)

(52) U.S. Cl.
CPC ........ *G06F 3/0418* (2013.01); *G06F 3/03545* (2013.01); *G06F 3/044* (2013.01); *G06F 3/0412* (2013.01); *G06F 2203/04106* (2013.01)

(58) Field of Classification Search
CPC .. G06F 3/0416; G06F 3/0418; G06F 3/03545; G06F 3/0412; G06F 3/044
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| EP | 1 645 951 A2 | 4/2006 |
| JP | 2000-163031 A | 6/2000 |

(Continued)

OTHER PUBLICATIONS

Non-Final Office Action dated Mar. 30, 2016, for U.S. Appl. No. 15/014,884, filed Feb. 3, 2016, 19 pages.

(Continued)

*Primary Examiner* — Dennis P Joseph
(74) *Attorney, Agent, or Firm* — Morrison & Foerster LLP

(57) ABSTRACT

Electrode configurations for reducing wobble error for a stylus translating on a surface of a touch sensor panel is disclosed. Electrodes associated with a more linear signal profile can correlate to lower wobble error. In some examples, electrodes can be configured such that the signal profile associated with each electrode is spread to be wider, and thus, more linear. In some configurations, electrodes can include two or more bars extending along the length of the electrode with each bar electrically connected to one another at one or both ends. Bars can be of non-uniform width or spacing. Some configurations can include a "split bar," which can divide a bar lengthwise in order to improve optical uniformity. In some examples, electrodes can include projections which can interleave with corresponding projections in adjacent electrodes.

19 Claims, 17 Drawing Sheets

(56) References Cited

U.S. PATENT DOCUMENTS

| | | | |
|---|---|---|---|
| 5,543,589 | A | 8/1996 | Buchana et al. |
| 5,825,352 | A | 10/1998 | Bisset et al. |
| 5,835,079 | A | 11/1998 | Shieh |
| 5,880,411 | A | 3/1999 | Gillespie et al. |
| 5,933,102 | A | 8/1999 | Miller et al. |
| 6,147,680 | A | 11/2000 | Tareev |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,030,860 | B1 | 4/2006 | Hsu et al. |
| 7,184,064 | B2 | 2/2007 | Zimmerman et al. |
| 7,663,607 | B2 | 2/2010 | Hotelling et al. |
| 7,791,596 | B2 | 9/2010 | Errico et al. |
| 8,358,276 | B2 | 1/2013 | Hotelling et al. |
| 8,479,122 | B2 | 7/2013 | Hotelling et al. |
| 8,723,830 | B2 | 5/2014 | Hotelling et al. |
| 2004/0239650 | A1 | 12/2004 | Mackey |
| 2005/0270273 | A1 | 12/2005 | Marten |
| 2006/0026521 | A1 | 2/2006 | Hotelling et al. |
| 2006/0038791 | A1 | 2/2006 | Mackey |
| 2006/0197753 | A1 | 9/2006 | Hotelling |
| 2008/0006453 | A1 | 1/2008 | Hotelling |
| 2008/0074398 | A1 | 3/2008 | Wright |
| 2009/0159344 | A1 | 6/2009 | Hotelling et al. |
| 2009/0244029 | A1 | 10/2009 | Huang et al. |
| 2009/0267916 | A1 | 10/2009 | Hotelling |
| 2009/0314621 | A1 | 12/2009 | Hotelling |
| 2010/0079402 | A1 | 4/2010 | Grunthaner et al. |
| 2011/0018557 | A1 | 1/2011 | Badaye |
| 2011/0050617 | A1 | 3/2011 | Murphy et al. |
| 2011/0175834 | A1* | 7/2011 | Han .................. G06F 3/044 345/173 |
| 2012/0075201 | A1 | 3/2012 | Golovchenko et al. |
| 2012/0098784 | A1* | 4/2012 | Kim .................. G06F 3/044 345/174 |
| 2013/0049771 | A1* | 2/2013 | Peng .................. G06F 3/0418 324/658 |
| 2013/0127781 | A1 | 5/2013 | Hotelling et al. |
| 2014/0085211 | A1 | 3/2014 | Shahparnia et al. |
| 2015/0309620 | A1* | 10/2015 | Shih .................. G06F 3/044 345/174 |
| 2016/0154522 | A1 | 6/2016 | Shahparnia et al. |
| 2016/0162073 | A1* | 6/2016 | Yilmaz .................. G01D 5/2405 345/174 |
| 2016/0209960 | A1* | 7/2016 | Lee .................. G06F 3/044 |
| 2017/0017333 | A1* | 1/2017 | Wang .................. G06F 3/044 |

FOREIGN PATENT DOCUMENTS

| | | |
|---|---|---|
| JP | 2002-342033 A | 11/2002 |
| WO | WO-2009/085775 A2 | 7/2009 |

OTHER PUBLICATIONS

Anonymous. (Oct. 10, 2002). "QMatrix™ Panel Design Guidelines," Quantum Research Application Note AN-KD01, *QRG Ltd.*, four pages.

Final Office Action dated May 23, 2011, for U.S. Appl. No. 11/963,716, filed Dec. 21, 2007, 12 pages.

Final Office Action dated Sep. 16, 2015, for U.S. Appl. No. 13/624,674, filed Sep. 21, 2012, sixteen pages.

International Search Report dated Oct. 15, 2009, for PCT Application No. PCT/US2008/087037, filed Dec. 16, 2008, four pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Feb. 4, 2011, for U.S. Appl. No. 11/963,716, filed Dec. 21, 2007, 13 pages.

Non-Final Office Action dated Dec. 20, 2011, for U.S. Appl. No. 11/963,716, filed Dec. 21, 2007, 16 pages.

Non-Final Office Action dated Jun. 21, 2013, for U.S. Appl. No. 13/745,654, filed Jan. 18, 2013, 25 pages.

Non-Final Office Action dated Dec. 16, 2014, for U.S. Appl. No. 13/624,674, filed Sep. 21,2012, seven pages.

Notice of Allowance dated Dec. 26, 2013, for U.S. Appl. No. 13/745,654, filed Jan. 18, 2013, 8 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Taiwan Search Report completed Nov. 26, 2012, for TW Patent Application No. 097149414, one page.

U.S. Appl. No. 13/406,338, filed Feb. 27, 2012, by Yousefpor et al.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

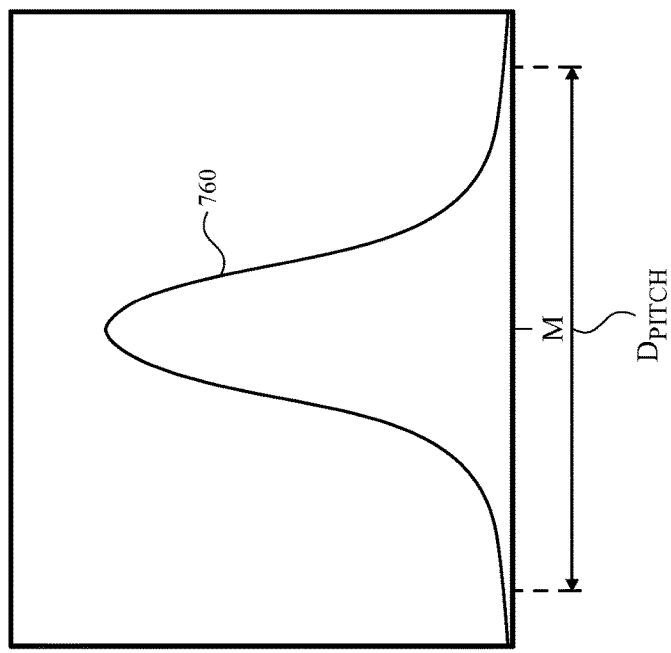
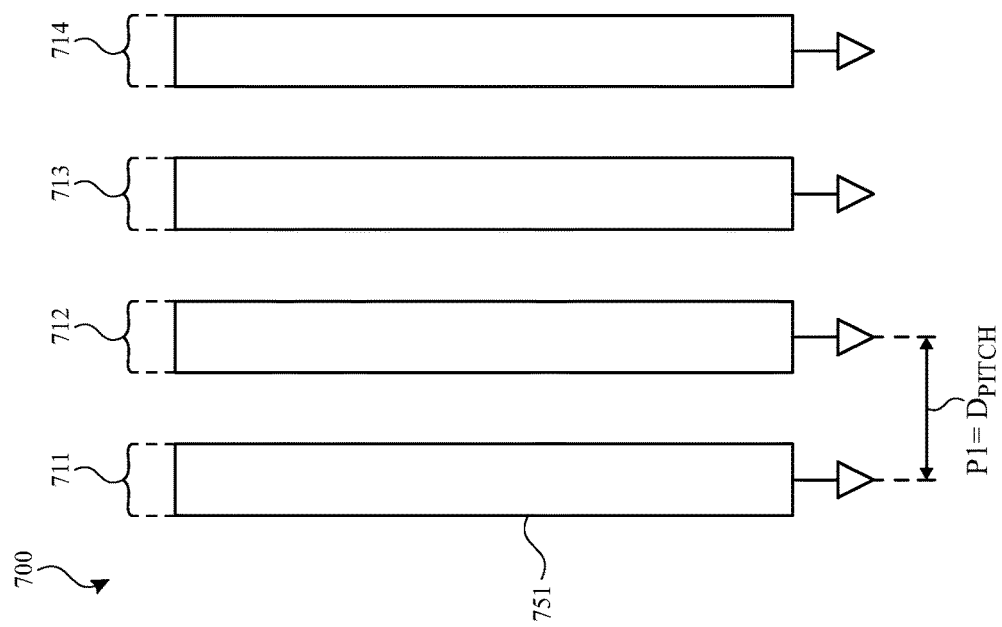
*FIG. 7B*
*FIG. 7A*

MULTI-BAR CAPACITIVE SENSE ELECTRODE

FIELD OF DISCLOSURE

This relates generally to touch sensing, and more particularly, to improving position calculation for objects touching a touch sensor panel.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices are increasingly being used to compose and mark-up electronic documents. In particular, styli have become popular input devices as they emulate the feel of traditional writing instruments. The effectiveness of a stylus, however, can depend on the ability to accurately calculate the position of the stylus on a touch sensor panel.

SUMMARY OF THE DISCLOSURE

Touch screens can allow a user to perform various functions by touching the touch sensor panel using a finger, stylus or other object. In some examples, the touch sensor panel can have errors in position detection, referred to herein as wobble error, when the touch object (e.g., a finger or stylus) is positioned between two of a plurality of sense electrodes. In some cases, wobble error can correlate to the signal profile between the touch object and electrodes within the touch sensor panel. Specifically, signal profiles which are narrower (i.e., less linear) can correlate to higher wobble error, while signal profiles which are widened within a range (i.e., to be more linear) can correlate to lower wobble error. This can be particularly evident in configurations in which the touch object is a stylus. Accordingly, in some examples, sense electrodes can be configured such that the signal profile associated with each sense electrode is spread to be wider, and thus, more linear. In some configurations, sense electrodes can include two or more bars extending along the length of the electrode with each bar connected to one another at one or both ends. In some examples, bars within a sensor can be non-uniformly spaced. Some bars (i.e., "split bars") can be positioned in groups of two or more, with the distance between bars within a group being relatively small (e.g., smaller than the individual width of a bar). Some adjacent bars within the sensor (e.g., two adjacent bars from two separate but adjacent groups) can be positioned at a greater distance than those bars within the group. Additionally, in some cases, adjacent electrodes can be positioned such that the distance between two electrodes is relatively small (e.g., as small as the distance between split-bars in a group). In some examples, sense electrodes can be configured to interleave with one another, including examples where interleaving electrodes also include split bars. It should be understood that although examples of the disclosure are discussed herein primarily in terms of a stylus, the examples of the disclosure are not so limited, but include other small objects, including small fingers, that can cause wobble error similar to a stylus. Similarly, although the examples of the disclosure are focused on the configuration of sense electrodes, other examples are contemplated within the scope of this disclosure including, but not limited to, configurations in which the configurations discussed herein are applied to drive electrodes or self-capacitance electrodes.

BRIEF DESCRIPTION OF THE DRAWINGS

FIGS. 7A-7B illustrate a customary sense electrode configuration and corresponding signal profile according to examples of this disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Touch screens can allow a user to perform various functions by touching the touch sensor panel using a finger, stylus or other object. In some examples, the touch sensor panel can have errors in position detection, referred to herein as wobble error, when the touch object (e.g., a finger or stylus) is positioned between two of a plurality of sense electrodes. In some cases, wobble error can correlate to the signal profile between the touch object and electrodes within the touch sensor panel. Specifically, signal profiles which are narrower (i.e., less linear) can correlate to higher wobble error, while signal profiles which are widened within a range (i.e., to be more linear) can correlate to lower wobble error. This can be particularly evident in configurations in which the touch object is a stylus. Accordingly, in some examples, sense electrodes can be configured such that the signal profile associated with each sense electrode is spread to be wider, and thus, more linear. In some configurations, sense electrodes can include two or more bars extending along the length of the electrode with each bar connected to one another at one or both ends. In some examples, bars within a sensor can be non-uniformly spaced. Some bars (i.e., "split bars") can be positioned in groups of two or more, with the distance between bars within a group being relatively small (e.g., smaller than the individual width of a bar). Some adjacent bars within the sensor (e.g., two adjacent bars from two separate but adjacent groups) can be positioned at a greater distance than those bars within the group. Additionally, in some cases, adjacent electrodes can be positioned such that the distance between two electrodes is relatively small (e.g., as small as the distance between split-bars in a group). In some examples, sense electrodes can be configured to interleave with one another, including examples where interleaving electrodes also include split bars. It should be understood that although examples of the disclosure are discussed herein primarily in terms of a stylus, the examples of the disclosure are not so limited, but include other small objects, including small fingers, that can cause wobble error similar to a stylus. Similarly, although the examples of the disclosure are focused on the configuration of sense electrodes, other examples are contemplated within the scope of this disclosure including, but not limited to, configurations in which the configurations discussed herein are applied to drive electrodes or self-capacitance electrodes.

Figure 1:
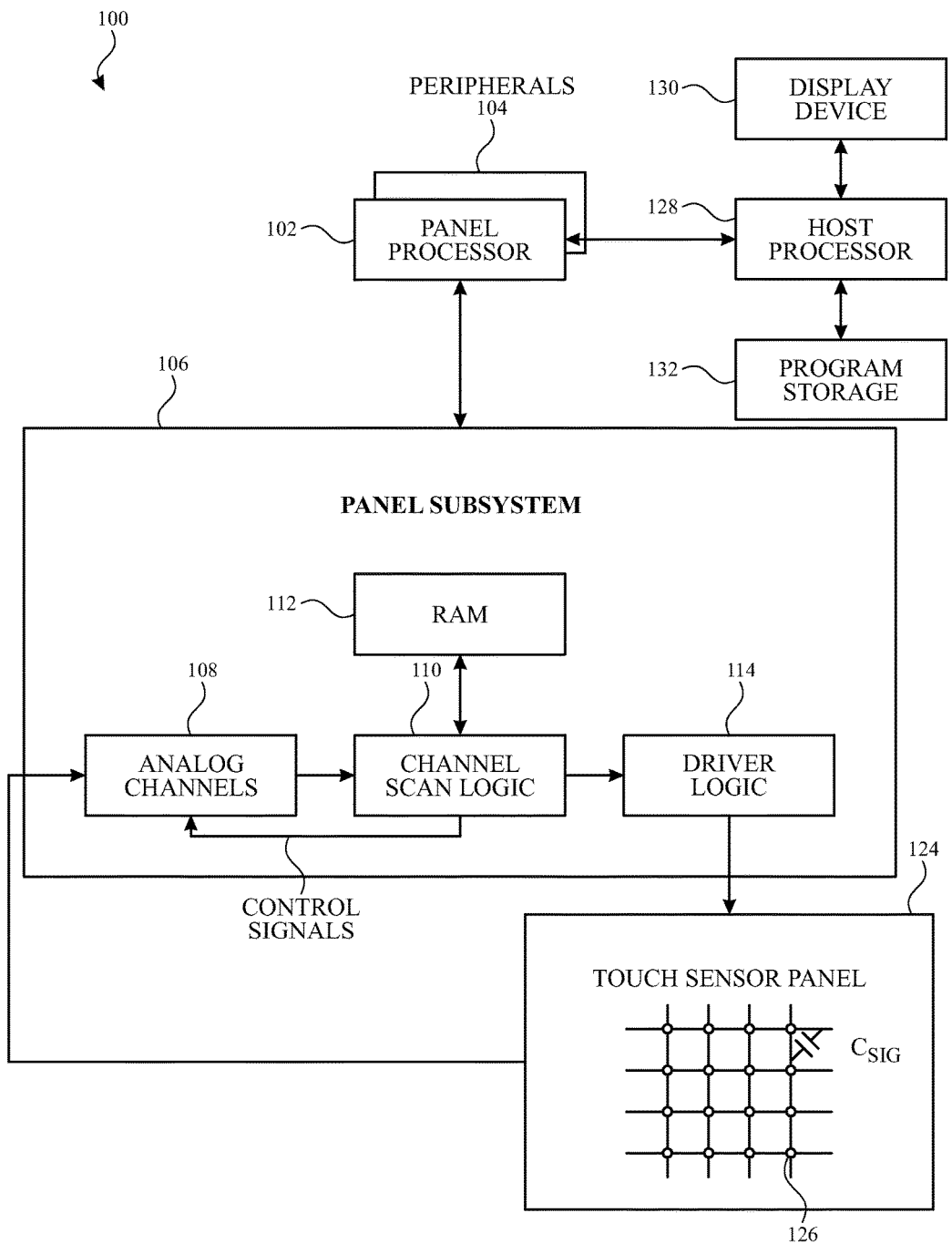
FIG. 1 illustrates an exemplary computing system capable of reducing stylus tip wobble according to examples of the disclosure.

FIG. 1 illustrates an exemplary computing system capable of reducing wobble according to examples of the disclosure. Computing system 100 can include one or more panel processors 102, peripherals 104, and panel subsystem 106. Peripherals 104 can include, but are not limited to, random access memory (RAM) or other types of memory or storage, watchdog timers and the like. Panel subsystem 106 can include, but is not limited to, one or more sense channels 108, channel scan logic (analog or digital) 110 and driver logic (analog or digital) 114. In mutual capacitance touch sensor panel examples, the panel can be driven and sensed using separate drive and sense lines, as shown in FIG. 1. However, in self-capacitance touch sensor panel examples, the sense electrodes can be driven and sensed using the lines. Channel scan logic 110 can access RAM 112, autonomously read data from sense channels 108 and provide control for the sense channels. In addition, channel scan logic 110 can control driver logic 114 to generate stimulation signals 116 at various phases that can be simultaneously applied to touch sensor panel 124. In some examples, panel subsystem 106, panel processor 102 and peripherals 104 can be integrated into a single application specific integrated circuit (ASIC).

In mutual capacitance sensing examples, touch sensor panel 124 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a transparent substrate, on opposite sides of the substrate, or on two separate substrates separated by dielectric material. Each intersection of drive and sense lines can represent a capacitive sensing node and can be viewed as picture element (pixel) 126, which can be particularly useful when touch sensor panel 124 is viewed as capturing an "image" of touch. (In other words, after panel subsystem 106 has determined whether a touch event has been detected at each sense electrode in the touch sensor panel, the pattern of sense electrodes in the multi-touch panel at which a touch event occurred can be viewed as an "image" of touch (e.g., a pattern of fingers touching the panel).) The capacitance between the drive and sense lines and local system ground can appear as a stray capacitance Cstray, and the capacitance at the intersections of the drive and sense lines, i.e., the touch nodes, can appear as a mutual signal capacitance Csig between the drive and sense lines when the given drive line is stimulated with an alternating current (AC) signal. The presence of a finger or other object (such as a stylus) near or on the touch sensor panel can be detected by measuring changes to a signal charge present at the nodes being touched, which can be a function of Csig. Each sense line of touch sensor panel 124 can be coupled to a sense channel 108 in panel subsystem 106. Touch sensor panel 124 can cover a portion or all of a surface of a device.

In self-capacitance sensing examples, touch sensor panel 124 can include a capacitive sensing medium having a plurality of sense electrodes. The sense electrodes can be formed from a transparent conductive medium such as ITO or ATO, although other transparent and non-transparent materials such as copper can also be used. The sense electrodes can be formed on a single side of a transparent or semi-transparent substrate, on opposite sides of the substrate, or on two separate substrates separated by dielectric material. In some examples, the sense electrodes can be viewed as picture element (pixel) 126, which can be particularly useful when touch sensor panel 124 is viewed as capturing an "image" of touch. In other examples, the sense electrodes can be configured as elongated sense rows and/or sense columns. The capacitance between the sense electrodes and system ground can represent the self-capacitance of those electrodes. The presence of a finger or other object (such as a stylus) near or on the touch sensor panel can be detected by measuring changes to the self-capacitance of nearby sense electrodes. Each sense electrode of touch sensor panel 124 can be coupled to a sense channel 108 in panel subsystem 106. Touch sensor panel 124 can cover a portion or all of a surface of a device In some examples, computing system 100 can also include a stylus as an input device. In some examples, the stylus can actively capacitively couple with the drive and/or sense lines of touch sensor panel 124 by, for example, transducing a signal from the stylus to the drive and/or sense lines. In some examples, the stylus can act as a passive input device in a mutual capacitance system, as described above. In some examples, the touch sensor panel 124 includes a conductive sensing media having a plurality of sense rows and a plurality of sense columns, or a plurality of sense electrodes. In these examples, a stylus can capacitively couple with the sense rows, sense columns, or sense electrodes.

Computing system 100 can also include host processor 128 for receiving outputs from panel processor 102 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. Display device 130 together with touch sensor panel 124, when located partially or entirely under the touch sensor panel, can form a touch screen.

In some examples, touch sensor panel 124 and display device 130 together can form an integrated touch screen in which touch sensing circuit elements of the touch sensing system (e.g., sense electrodes) can be integrated into the display pixel stackups of display device 130. The circuit elements in an integrated touch screen can include, for example, elements that can exist in LCD or other displays, such as one or more pixel transistors (e.g., thin film transistors (TFTs)), gate lines, data lines, pixel electrodes and common electrodes. It is noted that circuit elements are not limited to whole circuit components, such as a whole capacitor, a whole transistor, etc., but can include portions of circuitry, such as only one of the two plates of a parallel plate capacitor. In some configurations, each common electrode in an integrated touch screen can serve as a multi-function circuit element that can operate as display circuitry of the display system of the touch screen and can also operate as elements of the touch circuitry of the touch sensing system. Specifically, each common electrode can operate as a common electrode of the display circuitry of the touch screen (e.g., during a display phase), and can also operate as a common electrode (i.e., a sense electrode) of the touch circuitry of the touch screen (e.g., during a touch sensing phase). It should be understood that a display phase and a touch sensing phase of an integrated touch screen may be operated at the same time, e.g., partially or completely overlapping, or the display phase and touch sensing phase may operate at different times.

In general, each of the touch sensing circuit elements may be either a multi-function circuit element that can form part of the touch circuitry and can perform one or more other functions, such as forming part of the display circuitry, or may be a single-function circuit element that can operate as touch circuitry only. Similarly, each of the display circuit elements may be either a multi-function circuit element that can operate as display circuitry and perform one or more other functions, such as operating as touch circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

Note that one or more of the functions described above can be performed by firmware stored in memory (e.g., one of the peripherals 104 in FIG. 1) and executed by panel processor 102, or stored in program storage 132 and executed by host processor 128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2A:
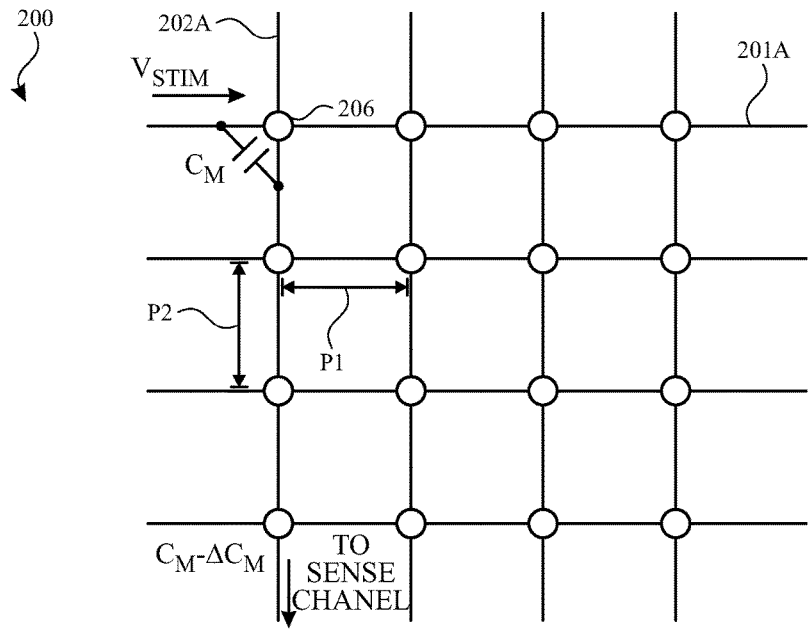
FIGS. 2A and 2B illustrate an exemplary mutual capacitance touch sensor panel that can be used to detect touch or hover (proximity) events according to examples of the disclosure.

FIG. 2A symbolically illustrates an exemplary mutual capacitance touch sensor panel that can be used to detect touch or hover (proximity) events according to examples of the disclosure. In some mutual capacitance examples, touch sensor panel 200 can include an array of touch nodes 206 formed at the crossing points of row electrodes (e.g., drive lines) 201a and column electrodes (e.g., sense lines) 202a, although as discussed above, it should be understood that other drive and sense configurations can be used. A stylus can include an electrode configured to alter the capacitive coupling between a crossing row electrode and column electrode. Each of the column electrodes 202 can output its capacitance readings to one or more touch sensing circuits, which can be used to detect a touch or hover event.

The distance between each adjacent touch node in the same row can be a fixed distance, which can be referred to as the pitch P1 for column electrodes. The distance between each adjacent touch node in the same column can be a fixed distance, which can be referred to as the pitch P2 for row electrodes. In some examples, the pitch for row electrodes and column electrodes can be the same, but in other examples, P1 and P2 can be different.

During a mutual capacitance scan, one or more drive rows 201a can be stimulated to drive the touch sensor panel 200. Touch nodes 206 can have a mutual capacitance Cm at the touch nodes 206 when there is no object touching or hovering over touch nodes 206. When an object touches or hovers over the touch node 206 (e.g. a stylus), the mutual capacitance Cm can be reduced by ΔCm, i.e., (Cm−ΔCm), corresponding to the amount of charge shunted through the object to ground. This mutual capacitance change can used to detect a touch or hover event and its location.

Figure 2B:
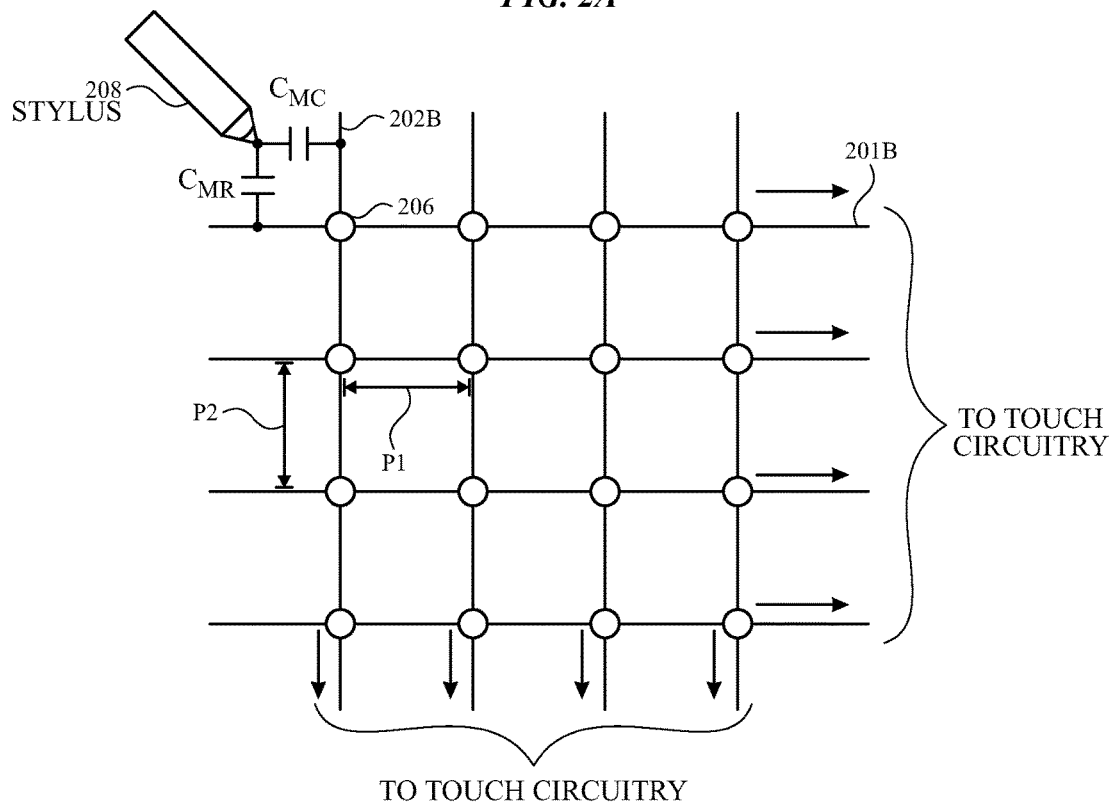

FIG. 2B symbolically illustrates an exemplary mutual capacitance touch sensor panel operable with an active stylus according to examples of the disclosure. In some mutual capacitance examples, an active stylus can generate stimulation signals (effectively operating as a drive electrode), and column electrodes 202b and row electrodes 201b can effectively operate as sense electrodes. During a stylus scan, one or more stimulation signals can be injected by stylus 208 into the touch sensor panel and can cause mutual capacitive coupling Cmr between the stylus 208 and the row traces 201b and capacitive coupling Cmc between the stylus 208 and the column traces 202b. The capacitance Cmr and Cmc can be transmitted to one or more touch sensing circuits for processing. In some examples, row traces 201b and column traces 202b can correspond to row electrodes 201a and sense columns 202a, however, during the stylus scan, stimulation signals are not applied to row electrodes 201 apart from signals generated by the active stylus. Additionally, in some examples, the touch sensor panel can include a stylus scan, a row scan, and a column scan, which can each operate as set forth above.

In some self-capacitance examples, touch sensor panel 200 can include a plurality of sense electrodes (touch nodes). In some examples, the sense electrodes can be configured as elongated sense rows 201 and/or sense columns 202. In other examples each sense electrode can be electrically isolated from the other sense electrodes and configured to represent a particular x-y location (e.g. touch node 206) on the panel. Such a touch screen can be referred to as a pixelated self-capacitance touch screen. A stylus can include an electrode configured to capacitively couple to a sense electrode. Each of the sense electrodes can output its capacitance readings to one or more touch sensing circuits, which can be used to detect a touch or hover event.

In some cases, an object, such as a stylus, may touch or hover at a position not directly over a touch node 206, but in between two touch nodes 206. For example, a stylus may touch or hover at a position between two row electrodes 201, between two column electrodes 202, or both. In these examples, the signal sensed at a plurality of touch nodes 206 may be used to estimate the location of the touch or hover event. In some examples, a centroid estimation algorithm can calculate the location of the touch or hover event using the signal sensed at the plurality of touch nodes 206. For example, the position of a stylus on a touch sensor panel along an x-axis can be calculated by computing a weighted centroid defined in Equation (1):

$$x_{calc} = \frac{\sum_{i=-N}^{N} x_i S_i}{\sum_{i=-N}^{N} S_i} \quad (1)$$

where $x_{calc}$ can be the calculated position along the x-axis, $S_i$ can be the signal measured at the $i^{th}$ electrode, such as a sense electrode, along the x-axis, and $x_i$ can be the position of the $i^{th}$ electrode along the x-axis. It is to be understood that the centroid estimation algorithm defined in equation (1) is given only as an example, and the configurations described herein need not be limited to such examples. Instead, the calculation of a touch or hover location of an object can be accomplished using any appropriate method.

Ideally, as an object such as a stylus traverses between two touch nodes, the calculated position of the stylus on the touch screen and the actual position of the stylus should be the same. In reality, the calculated position may be different from the actual position due to limitations in the circuit configuration and the position estimation algorithms used. Errors resulting from the disparity between calculated position and actual position as an object moves along a touch sensor panel can be referred to as wobble error.

Figure 3A:
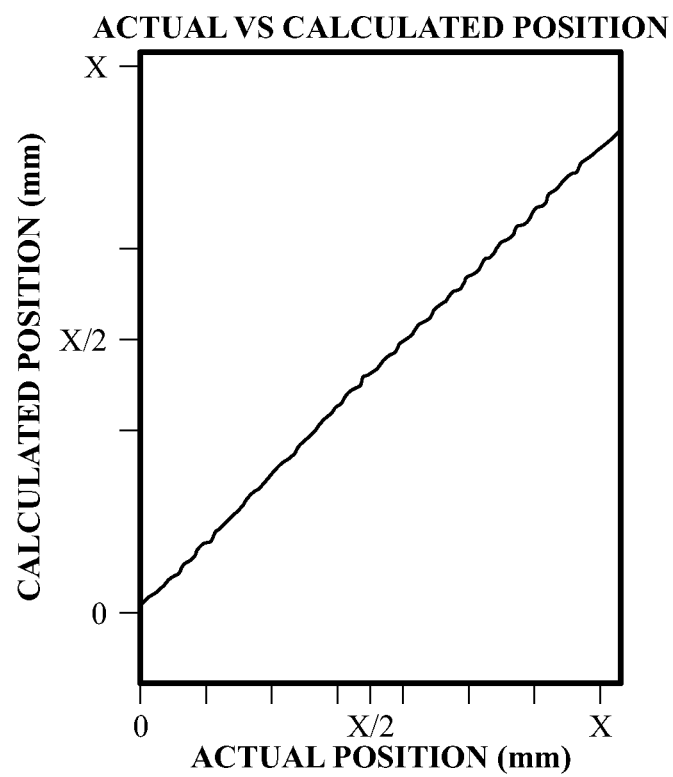
FIGS. 3A and 3B illustrate examples of the disparity between actual position and calculated position as a stylus moves along one axis of a touch sensor panel according to examples of the disclosure.
Figure 3B:
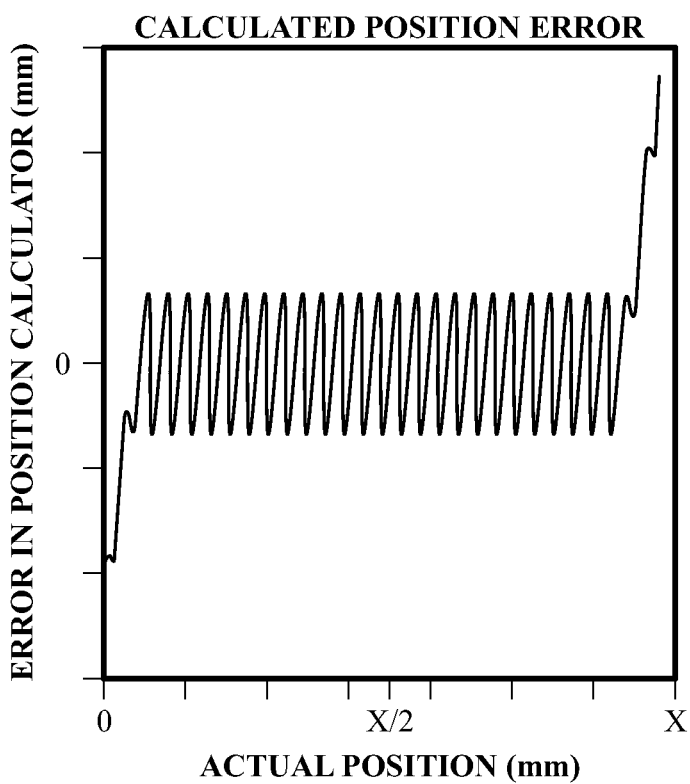

It can be useful to consider wobble error in the context of a stylus moving along a single axis of a touch sensor panel having conventional sense electrodes (i.e., single-bar electrodes). This concept is illustrated by example in FIGS. 3A and 3B. FIGS. 3A and 3B illustrate examples of the disparity between actual position and calculated position as an object, such as a stylus, moves along an x-axis of a customary touch sensor panel (e.g., a touch panel without multiple-bar electrodes) according to examples of the disclosure. FIG. 3A illustrates a plot of the calculated position of the stylus versus the actual position of the stylus when calculating position by using a weighted centroid algorithm including a subset of the electrodes (e.g., five electrodes) along an x-axis. In an ideal case, where calculated position and actual position are the same, the plot can be a straight line at a 45 degree angle. However, because of non-idealities in the coupling between the stylus and the touch sensor panel and the algorithm used to calculate stylus position, there can be non-ideal results that can appear as a wobble in the plot of FIG. 3A as the stylus moves between electrodes along the x-axis. In other words, the signal coupling between the stylus and touch sensor panel and the calculated position metric can introduce an error in calculated position (discrepancy with actual position) that can cause a wobble to be displayed when plotting the actual versus calculated position.

FIG. 3B illustrates a plot of the error in position calculation versus the actual position when calculating position by taking a weighted centroid including a subset of the electrodes (e.g., five electrodes) along an x-axis. The oscillation of the error plot can be representative of the wobble due to remaining error in the position calculation in a customary touch panel (e.g., a touch panel without multiple-bar sense electrodes).

It should be noted that the scope of this disclosure can extend beyond the context of an active stylus coupling to sense electrodes, however, the examples of this disclosure focus on a stylus-sense electrode configuration for ease of description. FIGS. 3A and 3B relate to calculating position using a subset of the electrodes, however, it should be understood that the position could be calculated using any number of electrodes, including all of the electrodes in a touch sensor panel. Moreover, although FIGS. 3A and 3B are described with reference to the x-axis, in some examples, similar effects can be observed when moving the stylus across the touch sensor panel along the y-axis.

Figure 4A:
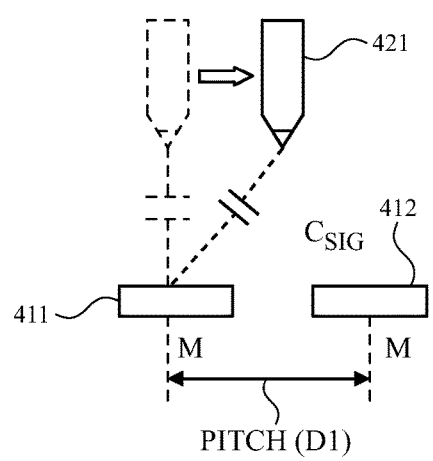
FIGS. 4A and 4B illustrate example signal profiles as a stylus moves along an axis of a touch sensor panel according to examples of the disclosure.
Figure 4B:
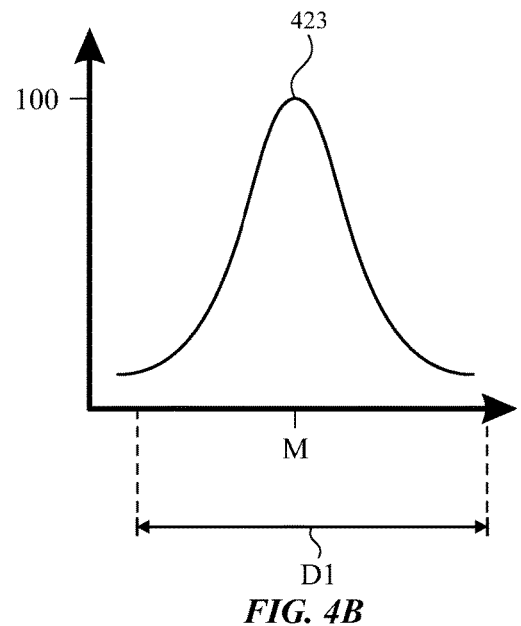

It can be useful to discuss the characteristics of the electrode configuration of a touch sensor panel in terms of the signal profile between a stylus and an electrode. This concept is explained by example with reference to FIGS. 4A and 4B. FIGS. 4A and 4B relate to an example signal profile in an x-axis of an example electrode 411 having a pitch with a distance D1 as shown. As shown in FIG. 4A, an object, such as a stylus 421, can be at a distance above an electrode 411 and moved in an x-direction across electrode 411. At each point along the x-axis, a signal coupling Csig exists between the stylus and the electrode, which varies as the stylus moves from the midpoint M of electrode 411. FIG. 4B illustrates a plot of an example signal profile, which can correlate to the signal Csig sensed on electrode 411 from stylus 421 as the stylus is moved in the x-direction. In some examples, such as when the stylus 421 is an active stylus, the signal Csig may represent a signal transduced by the stylus on the electrode. In some examples, the signal Csig may correspond to a self-capacitance of an object detected by the electrode or a change in mutual capacitance between a drive electrode and sense electrode. The x-axis of the plot in FIG. 4B can correlate to the position of the stylus in the x-axis relative to a midpoint M of an electrode 411, and the y-axis of the plot in FIG. 4B can correlate to a normalized signal measurement at each x-position along the x-axis. The midpoint M of the x-axis of the plot in FIG. 4B can correspond to the midpoint M of electrode 411 shown in FIG. 4A. As shown in FIGS. 4A and 4B, the signal level can have a maximum value 423 when the stylus is at the midpoint of electrode 411, and the signal level can decrease as the stylus traverses the x-axis away from the midpoint. In some examples, the signal profile can be non-linear. As discussed in more detail below, the signal profile between a stylus and an electrode can vary greatly based on a variety of factors including, for example, the circuit configuration of the electrodes.

Figure 5A:
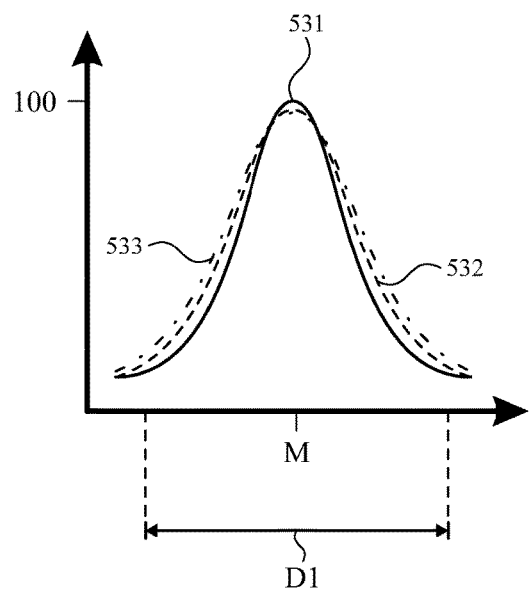
FIGS. 5A and 5B illustrate various signal profiles corresponding to various electrode configurations and levels of wobble error correlating with the signal profiles according to examples of the disclosure.
Figure 5B:
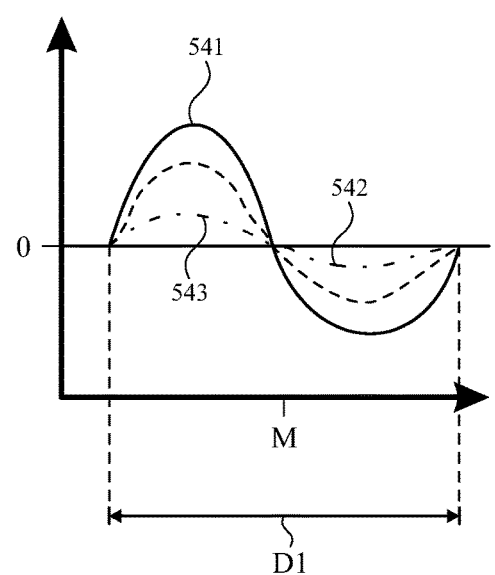

In some examples, the wobble error of a touch sensor panel can correlate with the signal profile between a stylus and electrodes formed on the touch sensor panel. FIGS. 5A and 5B illustrate the correlation between three different example signal profiles 531-533 and the wobble error 541-543 associated with each of the example signal profiles. FIG. 5A illustrates plots of three example signal profiles 531, 532 and 533. As described above with reference to FIG. 4A and 4B, each signal profile can represent a signal Csig sensed on an electrode 411 from a stylus 421 as the stylus is moved in an x-direction. Each of the signal profiles 531, 532 and 533 in FIG. 5A can correspond to three hypothetical electrode configurations (not shown) A, B and C, each indicated by a different line pattern. Electrode configurations A-C can differ, for example, in electrode shape or circuit configuration.

FIG. 5B illustrates three example plots of the error in position calculation versus the actual position (i.e., wobble error) when calculating position of a stylus by taking a weighted centroid including a set of electrodes along an x-axis, with each error plot 541, 542 and 543 corresponding to a set of electrodes with electrode configurations A, B, and C, respectively. FIG. 5B is similar to the plot of FIG. 3B, however, unlike the plot in FIG. 3B, which has an x-axis spanning the length of the touch sensor panel, the x-axis of FIG. 5B spans only the distance D1 (e.g., the distance of the pitch) immediately surrounding a single electrode as shown. In some examples, the single oscillation in the error plots 541, 542 and 543 shown in FIG. 5B can be similar to one of the many oscillations shown in FIG. 3B. For clarity, each of the example electrode configurations A-C in FIGS. 5A and 5B are assumed to have an equal pitch and midpoint.

In some examples, if a signal profile is very non-linear, position estimation algorithms, such as that listed in equation (1), can produce higher wobble error when a stylus is positioned between touch nodes. In the example of FIGS. 5A and 5B, an electrode configuration A can correspond to signal profile 531 and wobble error plot 541. As shown in FIG. 5A, the shape of signal profile 531 corresponding to electrode configuration A is the least "spread" of signal profiles 531-533. In other words, signal profile 531 is the least linear signal profile as a stylus is moved away from the peak. As shown in FIG. 5B, error plot 541 corresponding to electrode configuration A has the most wobble error of the error plots 541-543. FIG. 5A also illustrates that the shape of signal profile 532 corresponding to electrode configuration B is more linear than signal profile 531. As shown in FIG. 5B, error plot 542 corresponding to electrode configuration B has less wobble error than error plot 541 corresponding to electrode configuration A. FIG. 5A further illustrates that the shape of signal profile 533 corresponding to electrode configuration C is the most linear of signal profiles 531-533, and its corresponding error plot 543 in FIG. 5B has the least wobble error of error plots 544-543. Thus, as illustrated in these examples, electrode configurations with more linear signal profiles are correlated with lower wobble error.

The configurations and plots represented in FIGS. 5A and 5B are presented only as examples of how a more linear signal profile can be correlated with lower wobble error, and should not be understood to represent specific values or scale. It should be understood that wobble error of a touch sensor panel can be determined by other factors in addition to configuration of the electrodes in the touch sensor panel, such as, for example, position calculation algorithms used, stylus shape, and electrode pitch. Moreover, the solutions discussed in this disclosure can apply to configurations different from those discussed with respect to FIGS. 5A and 5B, including configurations of mutual capacitance, self-capacitance, and configurations wherein the touch object is not a stylus.

As discussed above, electrodes having a more linear signal profile can correlate to a lower wobble error. Therefore, it can be beneficial to configure each electrode in a touch sensor panel to have a more linear signal profile by, for example, spreading the signal profile associated with each electrode outwardly toward adjacent electrodes. Thus, in some examples, it can be beneficial to form sense electrodes to include multiple bars extending along the length of the sense electrode and connected at one or both ends. Some examples of these multiple-bar sense electrode configurations will now be discussed below with reference to FIGS. 6-18.

Figure 6:
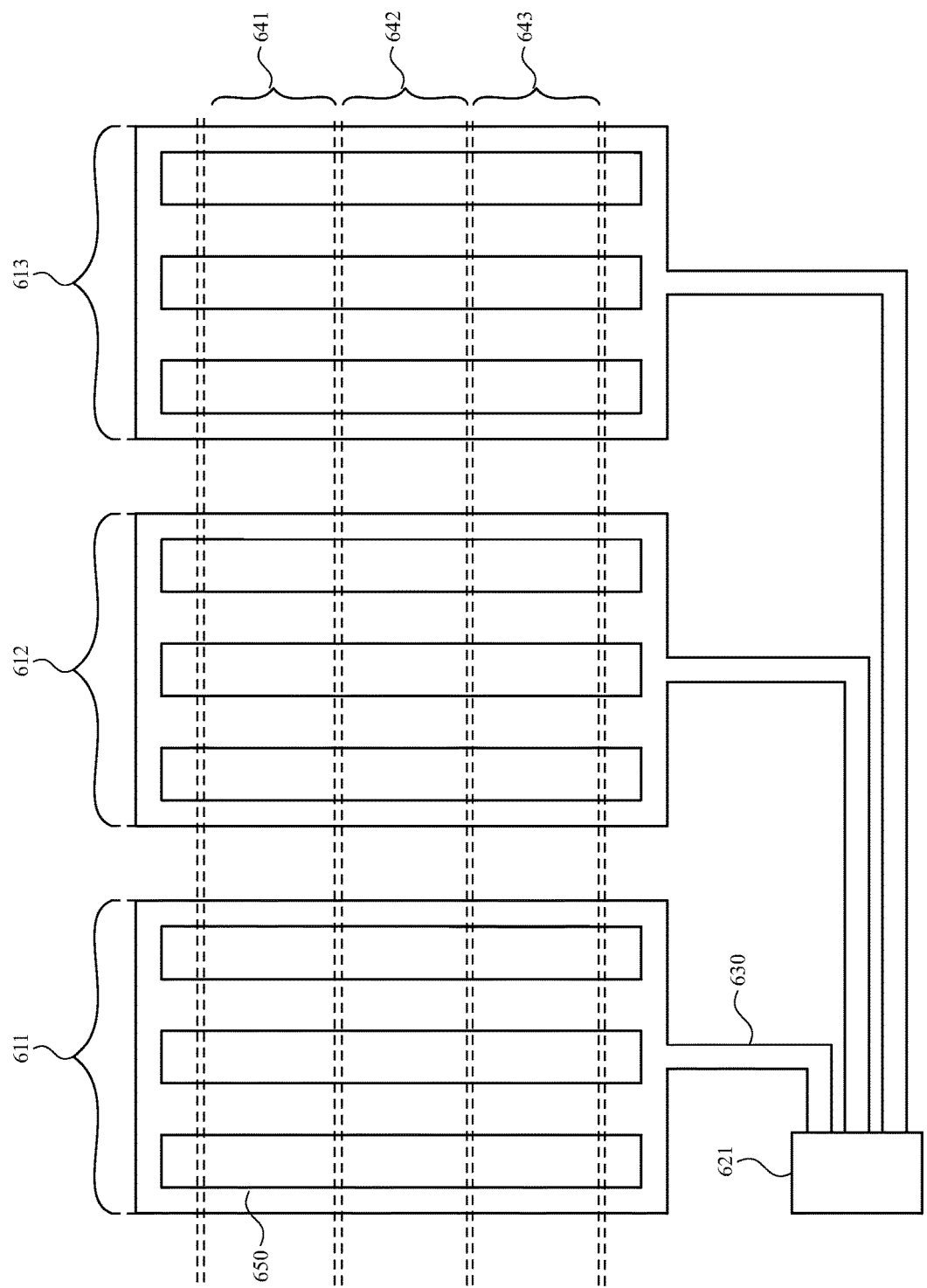
FIG. 6 illustrates an exemplary touch sensor panel system in which sense electrodes are in a multiple-bar configuration according to examples of this disclosure.

FIG. 6 illustrates a simplified diagram of an exemplary touch sensor panel system 600 including a plurality of sense electrodes 611-613, drive electrodes 641-643, touch sensing circuitry 621, and a plurality of conductive traces 630 coupling electrodes to the touch sensing circuitry 621. Electrodes can correspond, for example, to electrodes in a row electrode 201 or column electrode 202 as shown in FIG. 2A. Touch sensing circuitry 621 can perform touch position estimation based on the signals detected by one or more of the plurality of sense electrodes, as discussed above with reference to FIG. 2A. For ease of description, only three sense electrodes and three drive electrodes are shown, however, it is understood that the scope of this disclosure includes touch sensor panels with more sense electrodes as well as other supporting circuitry (e.g., drive circuitry) not shown in FIG. 6.

In some examples, each sense electrode (e.g., sense electrode 611) can include two or more bars (e.g., bars 650) extending along the sensor with each bar electrically connected to one another at one or both ends, although it should be understood that in other examples, not all bars may be connected at both ends, and in still other examples, all bars are disconnected at the end away from the touch sensing circuitry. As shown in FIG. 6, some bars can extend along the length of the sense electrode, while other bars (not shown) may only extend partially along the length of the sense electrode, or may have one or more conductive breaks along the bar. In some examples, the bars of sense electrodes may be connected to one another in the bezel areas of the touch sensor panel. The examples disclosed herein may include bars that are uniformly or non-uniformly spaced. Additionally, the examples disclosed herein may include sense electrodes having bars that are of uniform or non-uniform width. The dimensions and layout of the sense electrodes will be discussed in more detail below, but it should be noted here that sense electrodes can be configured to have any number of bars and any combination of widths and spacing which produce a more desirable (e.g., more linear) signal profile.

An exemplary mathematical procedure for engineering output signal profiles for the sense electrodes disclosed herein will now be described. FIGS. 7A-7B and 8A-8B compare a customary sense electrode configuration with an exemplary multiple-bar configuration according to examples of this disclosure.

FIG. 7A illustrates a customary sense electrode configuration 700 according to examples of this disclosure wherein sense electrodes having a pitch P1 equal to a distance $D_{PITCH}$, where each sense electrode includes a single bar 751. FIG. 7B illustrates a corresponding example signal profile 760 for a sense electrode in the configuration shown in FIG. 7A. The x-axis of the graph in FIG. 7B represents the position of an object (e.g., a stylus) along an x-direction of a touch sensor panel, and the y-axis represents the signal amplitude (e.g., the coupling capacitance) detected at the sense electrode at each point along the x-axis, as similarly described above with reference to FIGS. 4A and 4B. The midpoint M marked on the graph can represent the midpoint of the sense electrode, and the distance $D_{PITCH}$ indicated on the graph can correspond to the distance of the pitch P1.

Figure 8A:
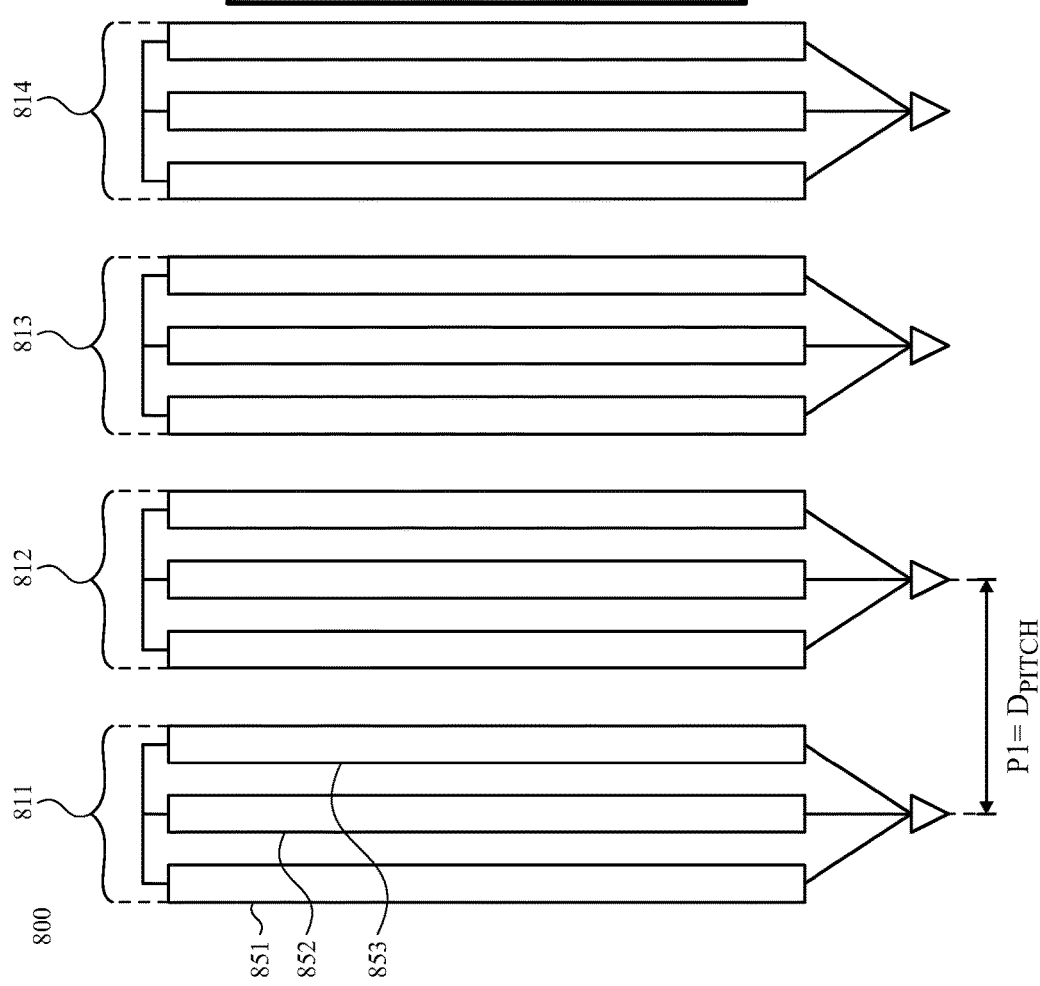
FIGS. 8A-8B illustrate an exemplary 3-bar sense electrode configuration and corresponding signal profile according to examples of this disclosure.

FIG. 8A illustrates an exemplary 3-bar sense electrode configuration 800 according to examples of this disclosure. As shown, each of sense electrodes 811-814 can be separated into three bars 851, 852, and 853, which can be electrically connected to one another at both ends. For ease of explanation, bars 851-853 shown in FIG. 8A are assumed to be of uniform weight and spacing. Moreover, for ease of comparison, pitch P1 shown in the configuration of FIG. 8A is assumed to be equal to pitch P1 shown in the configuration of FIG. 7A. As shown, the additional bars extend the sense electrodes closer to adjacent cells.

Figure 8B:
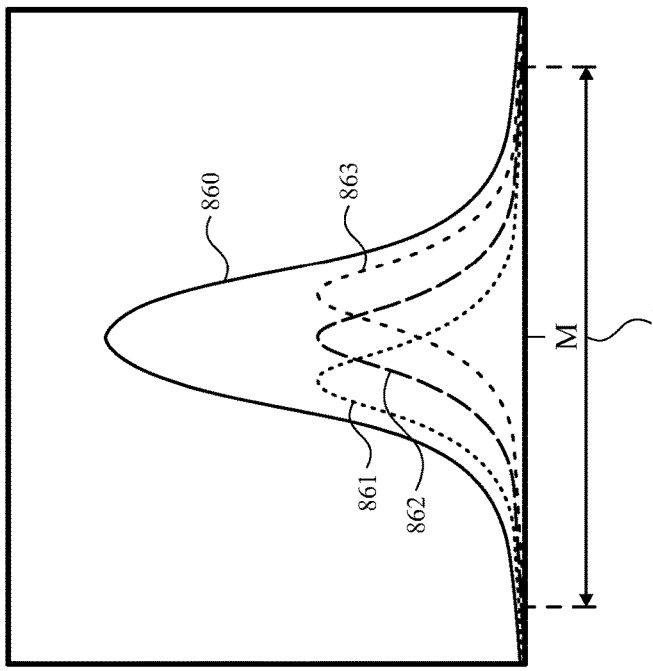

FIG. 8B illustrates an example signal profile 860 for a 3-bar sense electrode in the configuration shown in FIG. 8A. As in FIG. 7B, the x-axis of the graph in FIG. 8B represents the position of an object (e.g., a stylus) along an x-direction of a touch sensor panel, and the y-axis represents the signal amplitude (e.g., the coupling capacitance) detected at the sense electrode at each point along the x-axis, as similarly described above with reference to FIGS. 4A and 4B. The midpoint M marked on the graph can represent the midpoint of the sense electrode, and the distance D1 indicated on the graph can correspond to the distance of the pitch P1. As illustrated in FIG. 8B, the signal profile 860 of sense electrode 811 can be constructed as a superposition of weighted adjacent coupling capacitance profiles 861, 862, and 863 corresponding to bars 851, 852, and 853, respectively. That is, the capacitance profile of sensor 811 can be modeled as three separate capacitance profiles representing bars 851-853, even though the actual signal amplitude detected at sense electrode 811 does not distinguish between the coupling capacitance at the bars. In some examples, the superposition of the bars within a sensor to construct the signal profile of the sensor can be a linear or polynomial superposition.

As illustrated by comparing the signal profile 760 of the single bar sense electrode 711 (i.e., a customary sense electrode) shown in FIG. 7A with the signal profile 860 of the multiple-bar sense electrode 811 shown in FIG. 8A, the signal profile of a multiple-bar sense electrode can be more linear than the signal profile of a customary sense electrode. As discussed above with reference to FIGS. 4A-4B, a more linear signal profile can correlate to less wobble error in a touch sensor panel.

In general, the signal profile of a sense electrode having multiple bars can be represented by Equation (2) below:

$$S_i = W_1 \times P_1 + W_2 \times P_2 + W_3 \times P_3 + W_4 \times P_4 + W_5 \times P_5 + \ldots \quad (2)$$

Where $S_i$ represents the output signal of the multiple-bar sense electrode, $P_N$ represents the capacitance coupling profile of an $n^{th}$ bar, and $W_N$ represents the weight applied to the $n^{th}$ bar. For example, applying Equation (2) to the 3-bar sense electrode discussed with reference to FIG. 8A, the output signal $S_i$ can be represented as shown below in Equation (3):

$$S_i = W_1 \times P_1 + W_2 \times P_2 + W_3 \times P_3 \quad (3)$$

Assuming bars 1-3 have equal weight (e.g., $W_1 = W_2 = W_3 = 1$) and are equally spaced, the output signal $S_i$ can be further simplified as a linear superposition of three adjacent signals, as shown in the graph of FIG. 8B, and represented as in Equation (4) below:

$$S_i = P_1 + P_2 + P_3 \quad (4)$$

In some examples, the weight attached to a sense electrode bar can correspond to one or more of the dimensions (e.g., width and thickness) of the bar, the material the bar is composed of, the spacing of the bar in relation to the rest of the sense electrode, and additional circuitry (e.g., resistors) coupled to the bar, though the scope of this disclosure is not limited to these specific examples. By mixing adjacent signals with certain weights, output signal $S_i$ can be engineered to achieve a desired peak signal amplitude, profile width, and shape.

It should be understood that the number of bars implemented in a multiple-bar sense electrode can vary depending on the configuration of the touch panel (e.g., the stackup of the touch sensor panel), as well as design goals and constraints (e.g., layout, pitch size, and routing concerns).

Moreover, as discussed in more detail below, the width and/or spacing of bars in a multiple-bar sensor may be non-uniform.

Figure 9A:
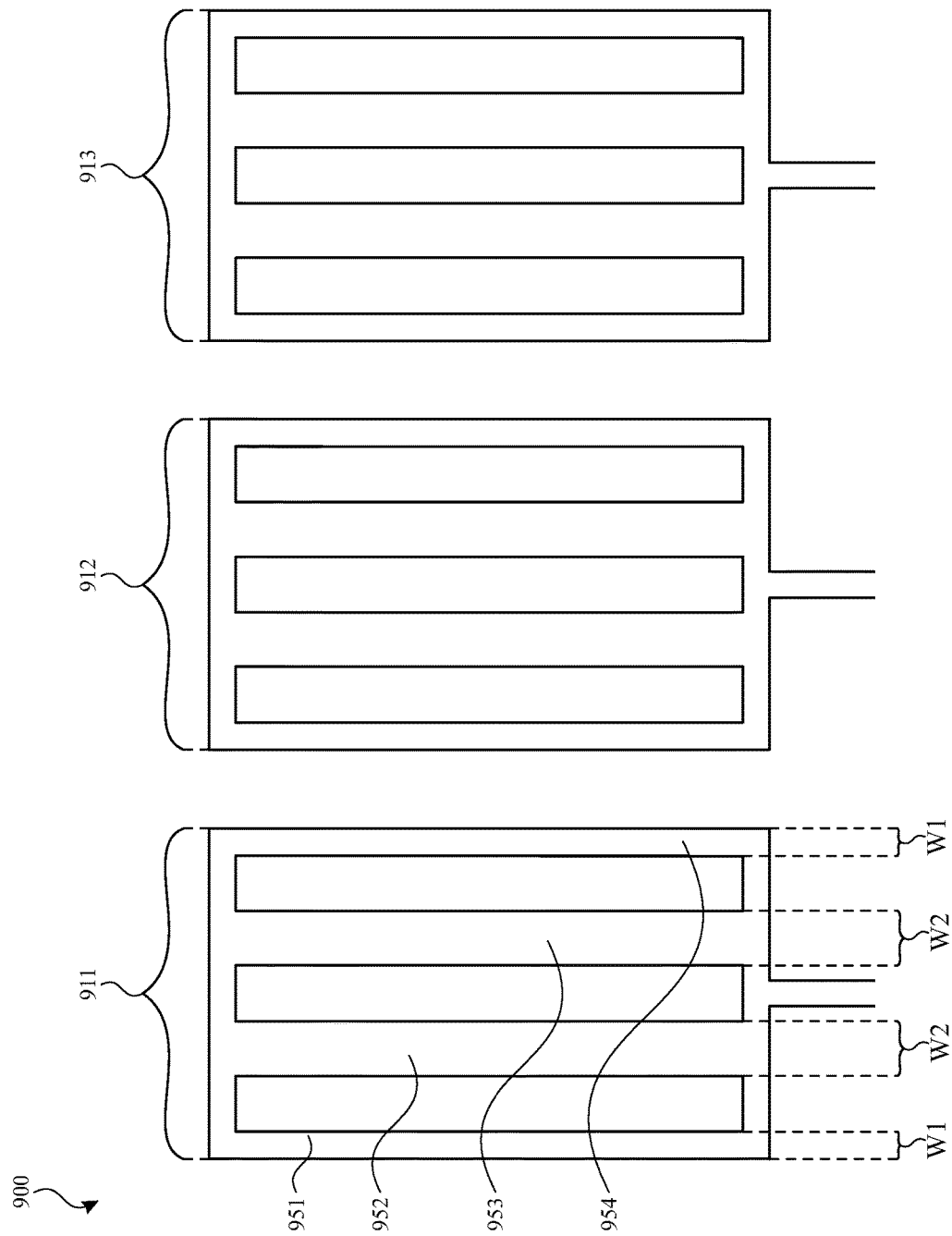
FIGS. 9A-9B illustrate an exemplary 4-bar sense electrode configuration and corresponding signal profile according to examples of this disclosure.

FIG. 9A illustrates an exemplary 4-bar sense electrode configuration 900 according to examples of this disclosure. As shown, sense electrodes 911-913 are in a 4-bar configuration having bars 951-954. As shown, the width of bars 951-954 can be non-uniform. In this example, bars 951 and 954 having a width W1 can be positioned on or near the outside of the sense electrode, while bars 952 and 953 having a greater width W2 can be positioned toward the center of the sense electrode. As will be explained, this configuration can also correspond to a more linear signal profile than a customary (i.e., single-bar) sense electrode, which can correlate to lower wobble error in the touch sensor panel.

Figure 9B:
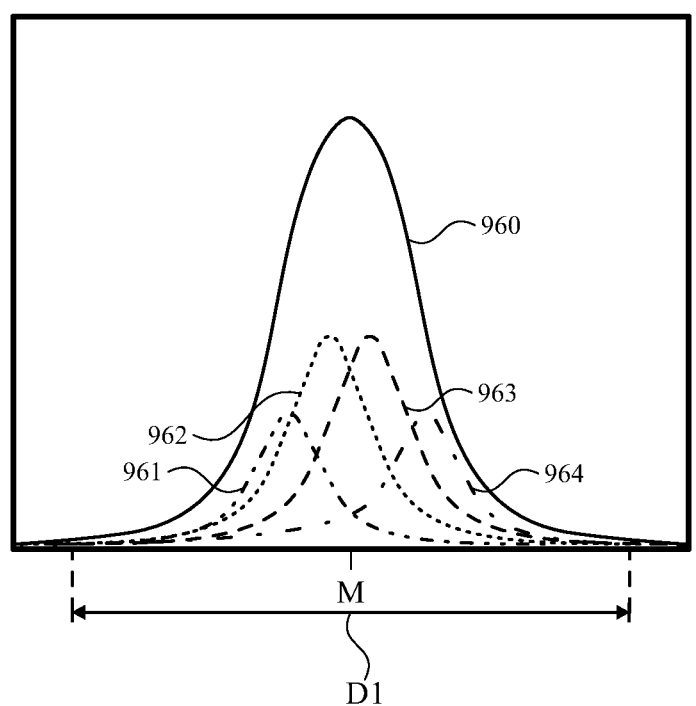

FIG. 9B illustrates an example signal profile of the sense electrode in a 4-bar configuration illustrated in FIG. 9A, wherein the bars 951-954 are of non-uniform width. As illustrated in FIG. 9B, the signal profile 960 can be constructed as a superposition of weighted adjacent coupling capacitance profiles of the bars in the sense electrode. Referring back to FIG. 9A, because bars 952 and 953 are of a greater width W2 than the width W1 of bars 951 and 954, the corresponding capacitance profiles shown in FIG. 9B are higher, resulting in an overall signal profile 960 which is more linear than the signal profile 760 of the single-bar sensor as shown in FIG. 7B or the signal profile 860 of the three-bar sensor as shown in FIG. 8B. The output signal of the 4-bar sense electrode can be expressed mathematically as Equation (5) below:

$$Si = W_1 \times P_1 + W_2 \times P_2 + W_3 \times P_3 + W_4 \times P_4 \tag{5}$$

Where $W_1$-$W_4$ can represent the respective weight assigned to bars 1-4. If bars 1 and 4 are of equal weight (e.g., of equal width), and bars 2 and 3 are of equal weight, the mathematical representation of the output signal simplifies to Equation (6) below:

$$Si = W_1(P_1 + P_4) + W_2(P_2 + P_3) \tag{6}$$

Where W2 is greater than W1.

As discussed with reference to FIGS. 9A-9B above, it can be beneficial to configure sense electrodes to have multiple bars of non-uniform width. However, in some examples, sense electrodes having non-uniform width can also cause optical non-uniformities in the touch sensor panel. Specifically, when multiple-bar sense electrodes such as 951-954 in FIG. 9A are formed in a repeated pattern across a touch screen, the distinction between bars 951, 954 and bars 952, 953 can be visually perceived by a touch screen user. Accordingly, in some examples, it can be beneficial to form multiple-bar sense electrodes which have a desired (e.g., more linear) signal profile, but which are also more optically uniform.

Figure 10A:
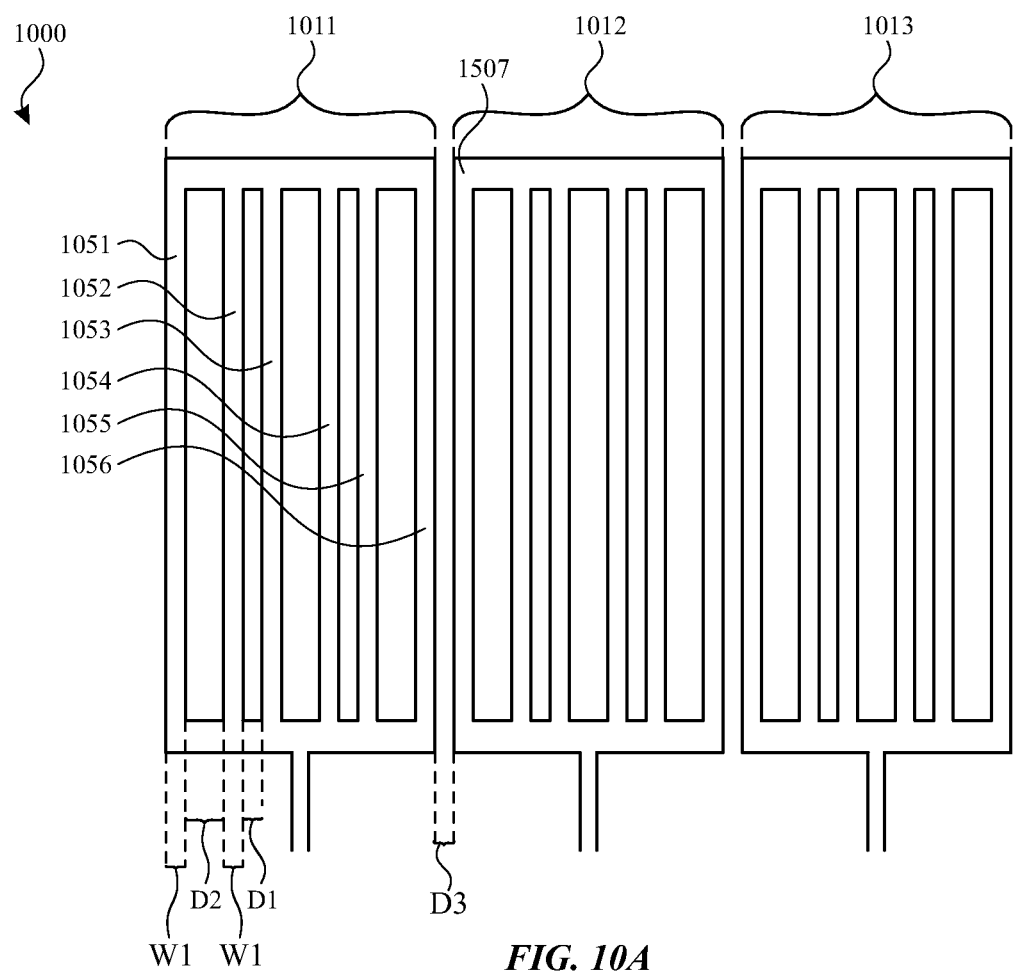
FIGS. 10A-10B illustrate an exemplary multiple-bar sense electrode in a split-bar configuration and corresponding signal profile according to examples of this disclosure.

FIG. 10A illustrates exemplary multiple-bar sense electrodes 1011-1013 in a split-bar configuration 1000 according to examples of this disclosure. As will be discussed, this configuration can correspond to a more linear signal profile, while overcoming the visual non-uniformities of multiple-bar sense electrodes having bars of non-uniform width. Conceptually, in this configuration, bars of a greater width in a non-split-bar configuration (e.g., bars 952 and 953 shown in the configuration of FIG. 9A) can essentially be divided in half lengthwise to form "split bars." In the example configuration shown in FIG. 10A, sense electrode 1011 has 6 bars 1051-1056, including 4 split bars 1052, 1053, 1054, and 1055 (i.e., a "6 bar 4 split sense electrode"). Split bars can be spaced closely together in groups of two or more, with the distance D1 between adjacent split bars in a group being relatively small, while other adjacent bars within the sensor (e.g., two adjacent bars belonging to two separate groups) can be spaced at a greater distance D2. For example, the distance D1 between adjacent split bars can be small enough that the signal profile of the split-bar sense electrode resembles the signal profile of a multiple-bar sense electrode having bars of non-uniform width, as will be explained in more detail below. In some examples, the distance D1 between split bars can be smaller than the width W1 of the split bars. Moreover, in some examples, the width of the split bars can be the same as the width of the non-split bars, that is, all bars are of uniform width. One of skill in the art would appreciate that the same widths includes tolerances that result in a 20% deviation.

Similar to the configuration described with reference to FIG. 9A, split bars 1052-1055 can be positioned toward the inside of sense electrode 1011, while non-split bars 1051 and 1056 can be positioned at the outside edges of the sense electrode. In some examples, the distance D3 between two adjacent sense electrodes can be the same as the distance D1 between adjacent split bars, which can improve optical uniformity by making the separation between split bars 1052-1053 and 1054-1055 resemble the separation between non-split bars at the edges of two adjacent sense electrodes (e.g., 1056 and 1057). As shown in the example configuration of FIG. 10A, the width W1 of split bars can be the same as the width of non-split bars, which can further improve optical uniformity, although in other examples, the width of split bars may be different from the width of non-split bars. One of skill in the art would appreciate that the same widths and same distances mentioned here can include tolerances that result in a 20% deviation.

Figure 10B:
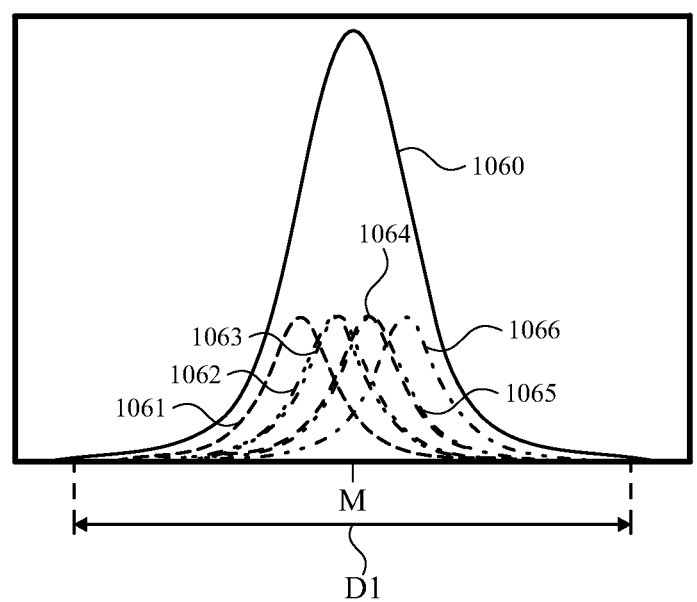

FIG. 10B illustrates an example signal profile 1060 of the 6-bar, 4-split touch electrode configuration shown in FIG. 10A. As indicated in the graph shown in FIG. 10B, signal profile 1060 can be constructed as a superposition of weighted adjacent coupling capacitance profiles 1061-1066, respectively corresponding to bars 1051-1056 in electrode sensor 1011. As indicated in FIG. 10B, the signal profile 1060 of an electrode sensor in a split-bar configuration can effectively match a signal profile of a sense electrode in a multiple-bar configuration where the split bars are combined (e.g., the signal profile 960 shown in FIG. 9B). The output signal of a 6-bar 4-split sensor electrode (e.g., the sense electrode in the configuration shown in FIG. 10A) can be expressed mathematically as Equation (7) below:

$$S_i = W_1 \times P_1 + W_2 \times P_2 + W_3 \times P_3 + W_4 \times P_4 + W_5 \times P_5 + W_6 \times P_6 \tag{7}$$

When split bars 2, 3, 4, and 5 have equal weight (e.g., equal width) such that $W_2 = W_3 = W_4 = W_5$, and non-split bars 1 and 6 also have equal weight such that $W_1 = W_6$, Equation (7) simplifies as shown in Equation (8) below:

$$S_i = W_1(P_1 + P_6) + W_2(P_2 + P_3 + P_4 + P_5) \tag{8}$$

It should be noted that sense electrodes in a split-bar configuration are not limited to the examples shown here, but can include configurations which have more than two sets of split bars. Moreover, sense electrode configurations in which split bars and non-split bars of a non-uniform width and spacing are also contemplated within the scope of this disclosure. In addition, although the weight assigned to each bar has been primarily discussed herein with reference to the width of bars, the weight assigned to a bar can be affected by a multitude of factors including, but not limited to, one or more of the material of the bar, cross sectional dimensions of the bar, and any additional circuitry (e.g., resistors) coupled to the bar.

Figure 11:
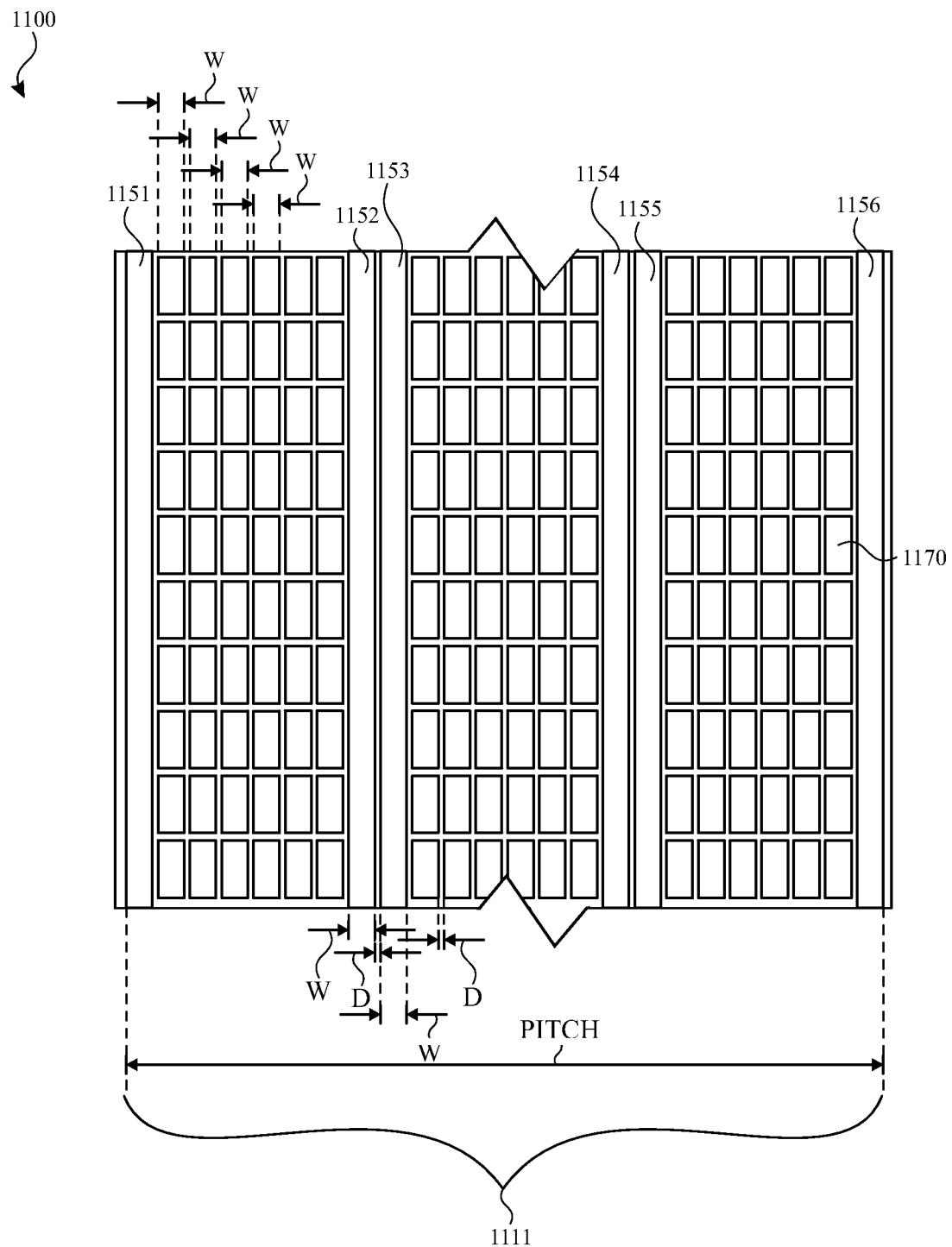
FIG. 11 illustrates an exemplary multiple-bar sense electrode in a split-bar configuration in a touch sensor panel layout which includes dummy elements.

In some examples, the optical uniformity of sense electrodes in a split-bar configuration can be further improved by adding dummy (e.g., floating) features in the space between bars. FIG. 11 illustrates a magnified view of an exemplary split-bar sense electrode layout which includes dummy elements 1170. The sense electrode 1111 shown in FIG. 11 can correspond, for example, to sense electrode 1011 shown in FIG. 10A, and includes 6 bars 1151-1156, 4 of which (1152-1155) are split bars. Dummy elements 1170 may be rectangular, square, or some other shape. By including dummy elements in the space between bars, optical transparency and reflection can appear more visually uniform throughout the touch sensor panel.

In some examples, dummy elements 1170 can be of the same width of one or more of the bars in the sense electrode. Though the example illustrated in FIG. 11 includes dummy elements only between adjacent bars that are not in a split bar group, other configurations not shown may include dummy elements between split bars within a group. In this example, all bars and dummy elements have the same width W and separation distance D, which is less than W, though one skilled in the art would appreciate that the same width and distance can include tolerances that result in a 20% deviation.

In general, the width of dummy elements and bars can be calculated mathematically as in Equation (9) below:

$$\text{Width} = \text{Pitch}/(N_{BARS} + N_{DUMMY} \times (N_{BARS}/2)) - D \quad (9)$$

where "Width" is the width of bars and dummy elements, $N_{BARS}$ represents the total number of bars in each sense electrode, $N_{DUMMY}$ represents the number of dummy elements between each bar, D is the separation distance between each bar or dummy element, and "Pitch" is the pitch of the sense electrodes.

It should be noted that dummy elements can be of any shape (e.g., a squiggle shape) and need not be rectangular. In some examples, the material forming dummy elements 1170 can be a transparent conductive material such as ITO. In some examples, the dummy elements can be formed of the same material as the ITO that forms sense electrodes 1110 in order to provide the best optical index matching to the ITO. In other examples, index matching materials may be applied to the ITO layer forming floating conductive segments to better match the optical index of the ITO layer forming electrodes. Moreover, dummy elements 1170 can be formed on either the same layer or a different layer from the layer forming sense electrodes 1110.

As discussed with reference to FIGS. 4A-4B above, it can be beneficial to configure sense electrodes such that the sensor profile of the sense electrode is widened in order to reduce wobble error in the touch sensor panel. Accordingly, in some examples, the sensor profile of a sense electrode can be widened by spreading sense electrodes across adjacent electrodes. In other words, the width of the sense electrode can be configured as to exceed the pitch.

Figure 12A:
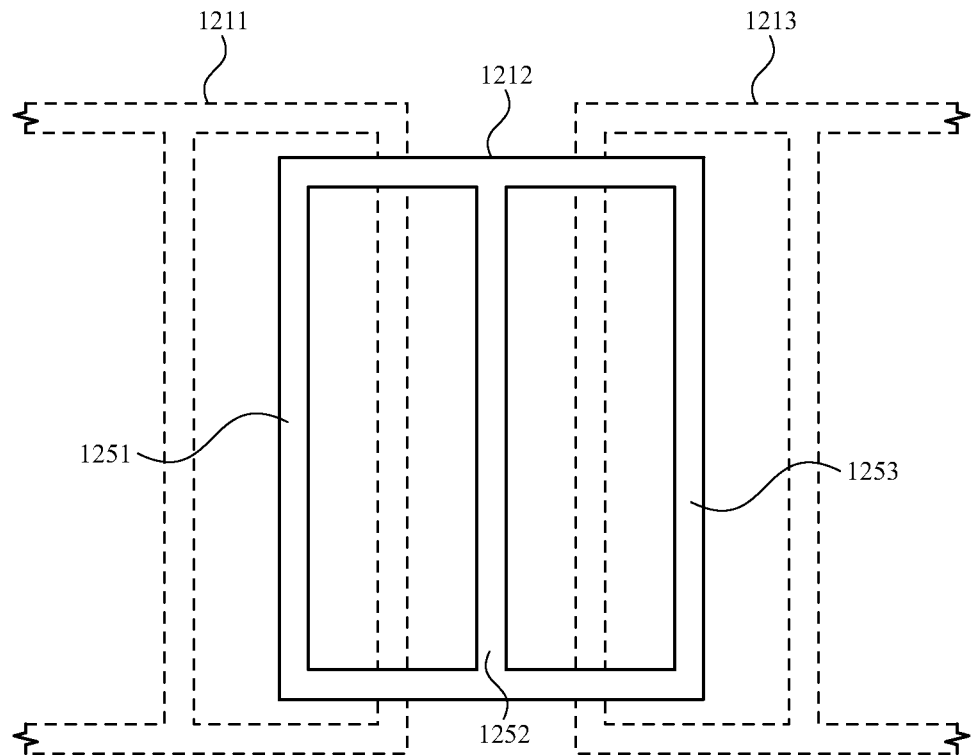
FIGS. 12A-12B illustrate exemplary multiple-bar sense electrodes in a touch sensor panel layout which includes overlapping electrodes according to examples of this disclosure.
Figure 12B:
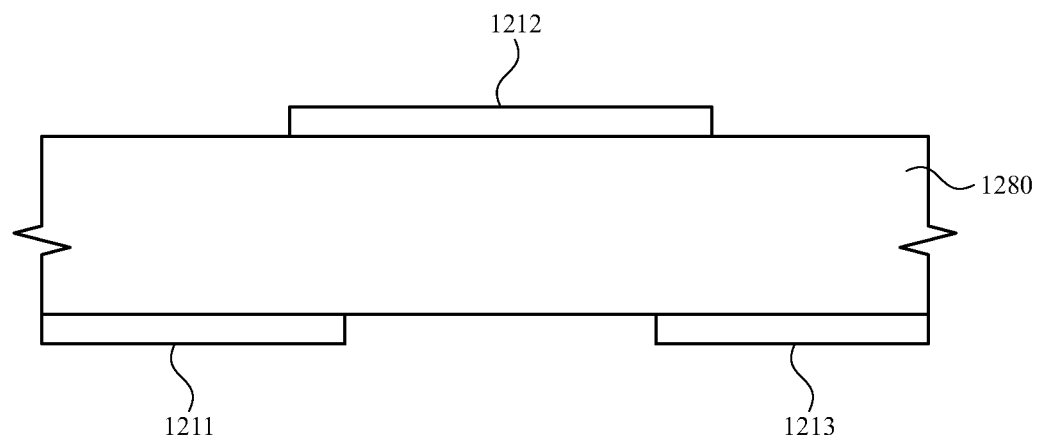

FIGS. 12A-12B illustrate exemplary multiple-bar sense electrodes in a touch sensor panel layout which includes overlapping electrodes according to examples of this disclosure. In such examples, sense electrodes can be implemented in a dual-sided touch arrangement on a dual-sided substrate (e.g., a dual-sided Indium Tin Oxide (DITO) substrate) 1280 with a first set of sense electrodes (e.g., sense electrode 1211 and 1213) formed on a first side of the substrate, and a second set of sense electrodes (e.g., sense electrode 1212) formed on a second side of the substrate as to overlap with the first set of sense electrodes. In other configurations, the first and second set of electrodes can be formed on different layers (e.g., on different substrates). Each sense electrode can include three bars 1251-1253 (although the third bars in sense electrodes 1211 and 1213 are not shown in FIG. 12A for purposes of simplifying the figure). In these configurations, sense electrodes can be positioned such that the spacing is collectively uniform between all of the bars of the first and second sets of sense electrodes. In other examples not shown, sense electrodes in an overlapping configuration can also utilize split bars as similarly discussed with reference to FIGS. 10A-10B above.

Although the overlapping configuration shown in FIGS. 12A-12B can produce a desirable signal profile, the use of dual-sided substrate for sense electrodes can increase manufacturing complexities and costs. Therefore, it can be beneficial to maintain the desirable signal profile of an overlapping configuration, but without requiring a DITO substrate.

Figure 13A:
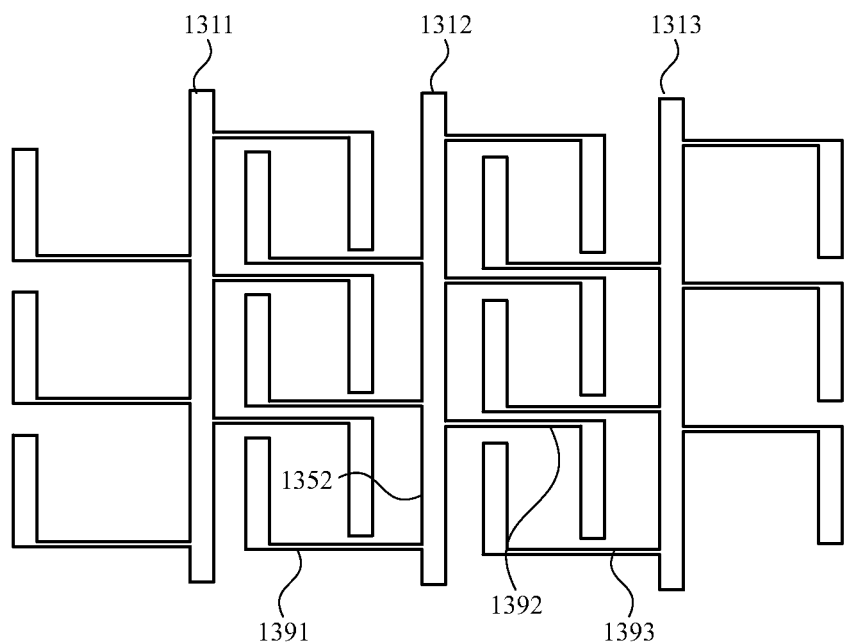
FIGS. 13A-13B illustrate exemplary sense electrodes in an interleaving configuration according to examples of this disclosure.
Figure 13B:
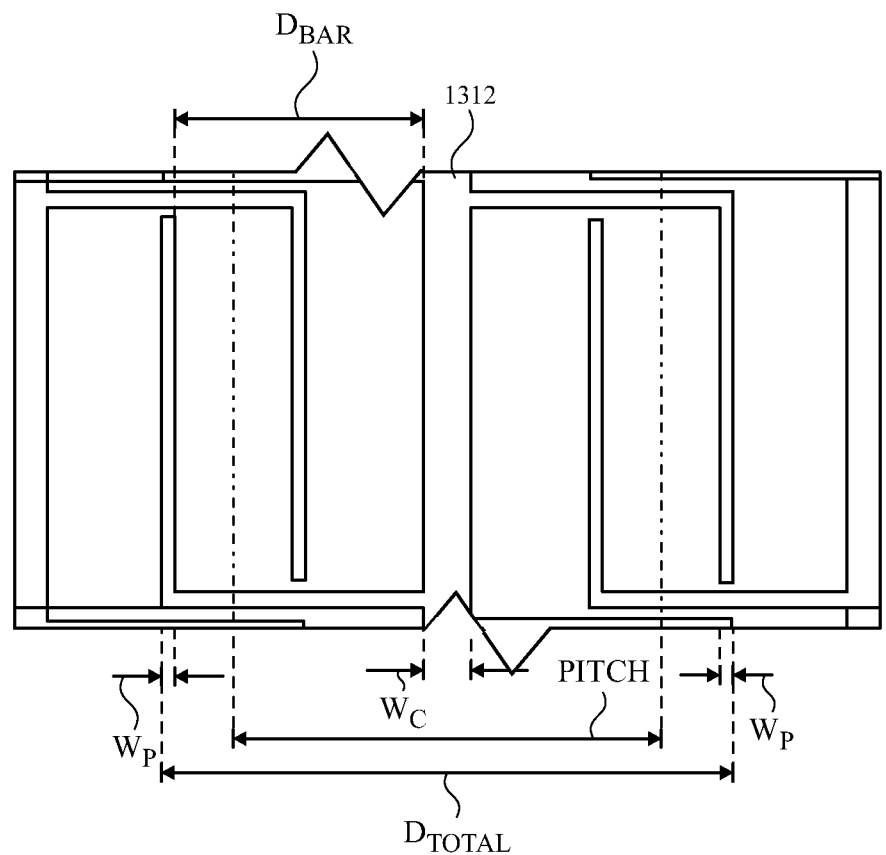

FIGS. 13A-13B illustrates exemplary sense electrodes in an interleaving configuration formed on a single-sided Indium Tin Oxide (SITO) substrate according to examples of this disclosure. In some examples, a first set of sense electrodes are formed on the SITO substrate, and a second set of sense electrodes are also formed on the same side of the SITO substrate as the first set of sense electrodes such that the first set of sense electrodes and the second set of sense electrodes are interleaved. In the example shown in FIG. 13A, sense electrode 1311 can have a center bar 1352, and can include two sets of projections 1391-1392, which are positioned at opposite sides of the center bar. Projections in one electrode (e.g., projections 1392 in electrode 1311) can interleave with projections in an adjacent electrode (e.g., projections 1393 in electrode 1312). Projections can be L-shaped and can include a vertical portion (that is, a portion in the direction parallel to the length of the sense electrode) and a horizontal portion (that is, a portion in the direction perpendicular to the length of the sense electrode). The vertical portion of the projections can be conceptually compared to the bars of the overlapping configuration discussed with reference to FIG. 12A. For example, projections 1391 in FIG. 13A can be conceptually compared to bar 1251 in FIG. 12A.

FIG. 13B illustrates a magnified view of a portion of sense electrode 1311. As shown, adjacent bars can be separated by a distance $D_{BAR}$, the vertical portions of projections 1391 can have a width $W_P$, and center bar 1351 can have a width $W_C$ which is greater than width $W_C$. In some examples, the distance $D_{TOTAL}$ between the outermost points of the sense electrode in a direction perpendicular to the length of the sense electrode can be greater than the pitch.

Figure 14A:
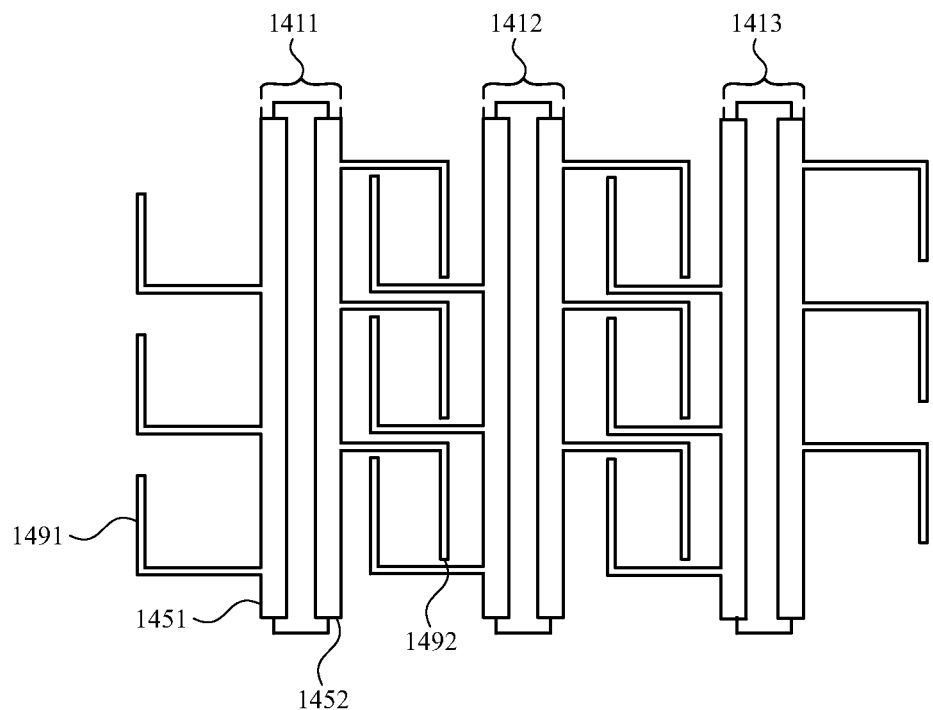
FIGS. 14A-14C illustrate exemplary sense electrodes in interleaving split-bar configurations according to examples of this disclosure.
Figure 14B:
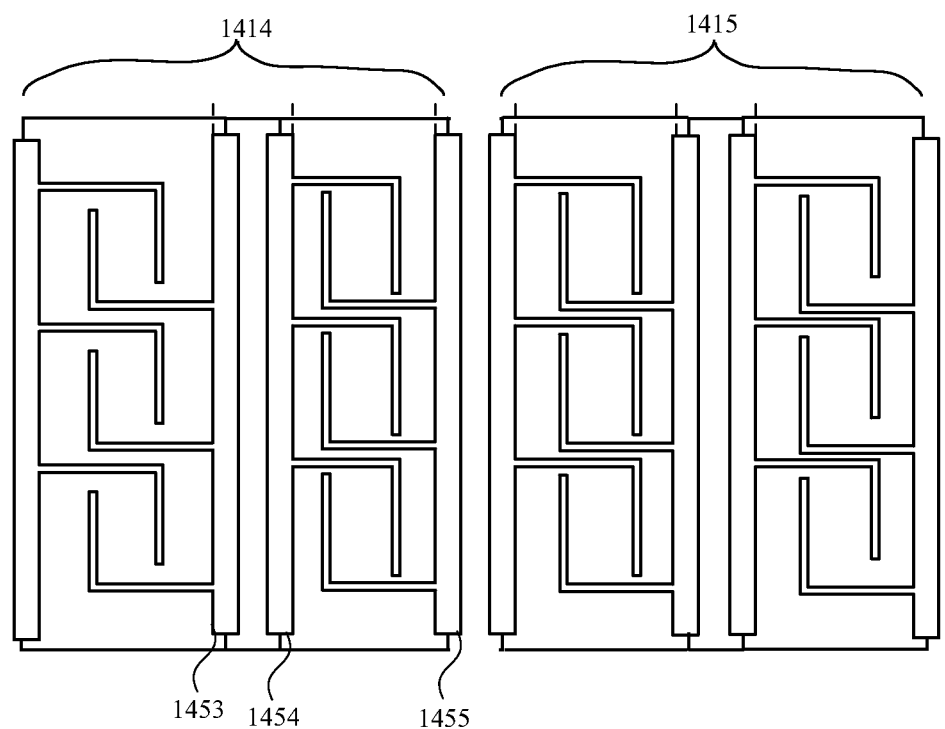
Figure 14C:
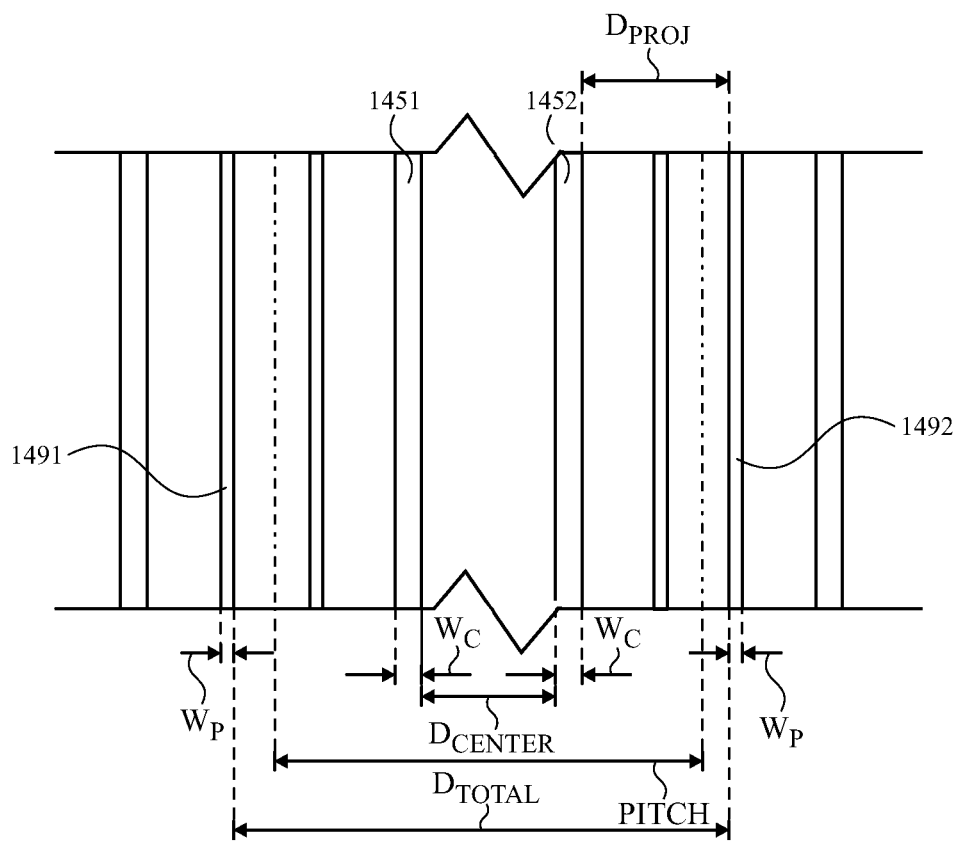

FIGS. 14A-14C illustrate exemplary sense electrodes in an interleaving split-bar configuration according to examples of this disclosure. As shown, sense electrode 1411 can include two split-bars 1451 and 1452 toward the center of the sense electrode, and two sets of projections 1491-1492 positioned toward the edges at opposite sides of the split-bars. The projections can be L-shaped and can each include a horizontal portion and a vertical portion. As with the examples discussed with reference to FIG. 12A-12B, the projections of sensor electrodes in these configurations can interleave with projections in adjacent sense electrodes.

FIG. 14B illustrates an exemplary sense electrode in another interleaving split-bar configuration according to examples of this disclosure. As shown, sense electrode 1414 can include 4 bars, including two bars (1453, 1454) in a split-bar configuration. As similarly discussed with reference to FIG. 10A above, the distance between split bars 1453 and 1454 can match the distance between sense electrodes 1414 and 1415. In some examples, adjacent bars that are not in a split bar group (e.g., 1454 and 1455) can be interleaved as similarly described with reference to FIG. 14A above. Moreover, in some examples, the configurations of FIGS. 14A and 14B can be combined, for example, such that a sense electrode interleaves with an adjacent sense electrode on a first side (as in FIG. 14A) and is separated by a small distance from an another adjacent sense electrode on a second side (as in FIG. 14B).

FIG. 14C illustrates a magnified view of a portion of sense electrode 1411 shown in FIG. 14A. As shown, center bars 1451 and 1452 can be separated by a distance $D_{CENTER}$, while vertical portions of projections 1491 can be horizontally separated from the nearest center bar by a distance $D_{PROJ}$, which can be greater than $D_{CENTER}$. Additionally, the vertical portions of projections 1491 can have a width $W_P$, and center bars 1451 and 1452 can both have a width $W_C$ which can be greater than width $W_P$. As in the example discussed with reference to FIGS. 13A-13B, the distance $D_{TOTAL}$ between the outermost points of the sense electrode in a direction perpendicular to the length of the sense electrode can be greater than the pitch.

Figure 15A:
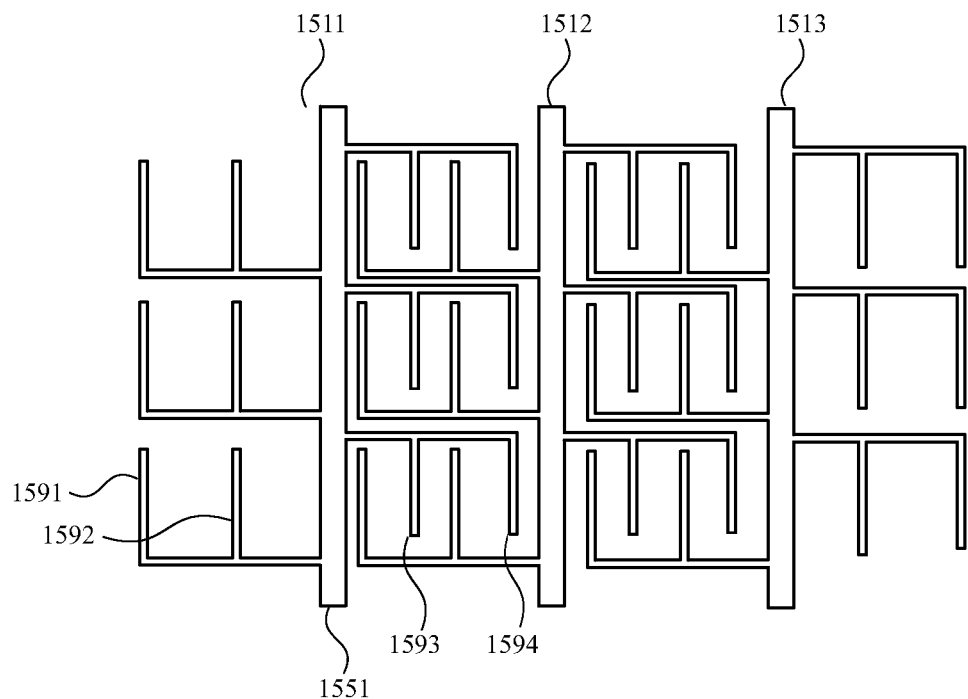
FIGS. 15A-15B illustrate other exemplary sense electrodes in an interleaving configuration in which each sense electrodes can have four sets of projections according to examples of this disclosure.
Figure 15B:
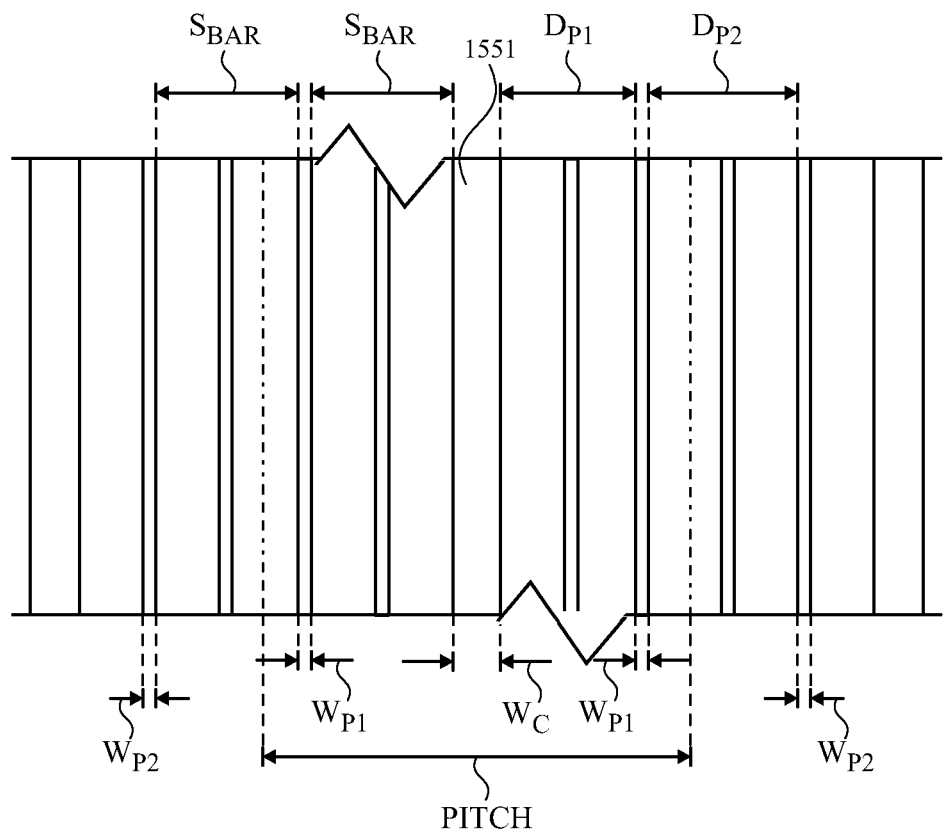

FIGS. 15A-15B illustrate other exemplary sense electrodes in an interleaving configuration in which each sense electrode can have four sets of projections according to examples of this disclosure. As shown in FIG. 15A, each sense electrode 1511 can have a center bar 1551 and four sets of projections 1591-1594, with two sets of projections each positioned on opposite sides of the center bar. As with the examples discussed with reference to FIGS. 13A-13B, the projections in these configurations can interleave with projections in adjacent sense electrodes.

FIG. 15B illustrates a magnified view of a portion of sense electrode 1511. As shown, center bar 1551 can be separated from the nearest projection by a distance $D_{P1}$, and vertical projection 1591 can also be separated horizontally from the nearest adjacent vertical projection by distance $D_{P1}$. Additionally, the vertical portions of innermost projections 1592 can have a width $W_{P1}$, while the vertical portion of outermost projections 1591 can have a width $W_{P2}$ which is greater than width $W_{P1}$. As in the examples discussed with reference to FIGS. 13A-13B, the distance $D_{TOTAL}$ between the outermost points of the sense electrode in a direction perpendicular to the length of the sense electrode can be greater than the pitch.

Figure 16A:
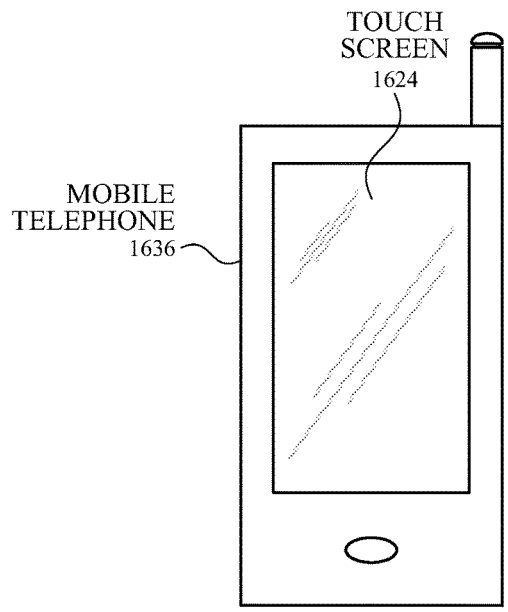
FIGS. 16A-16D illustrate example systems in which the multiple-bar sense electrode configurations for reducing stylus tip wobble according to examples of the disclosure can be implemented.
Figure 16B:
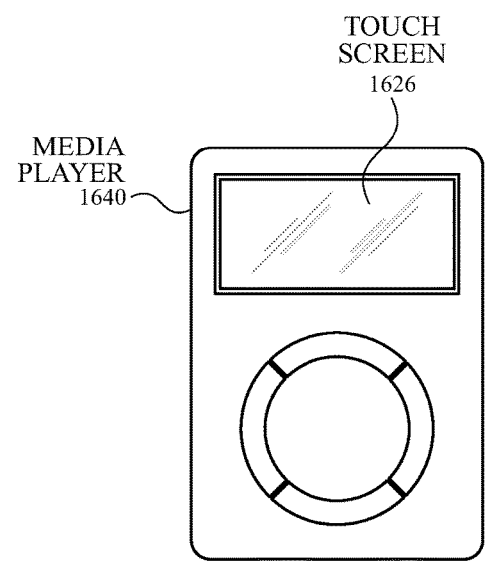
Figure 16C:
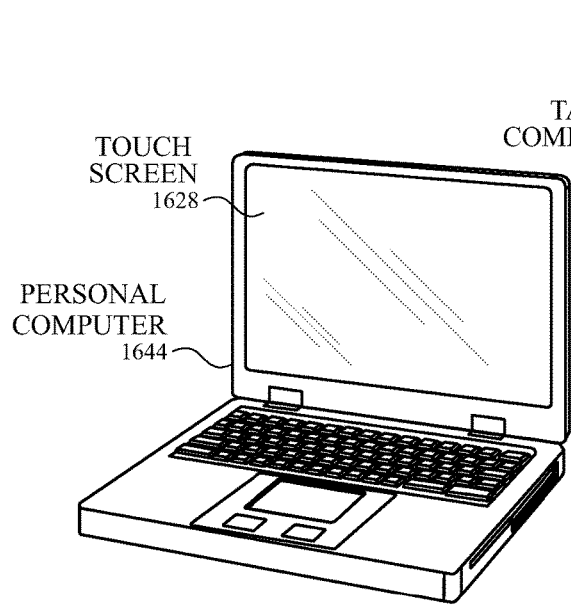
Figure 16D:
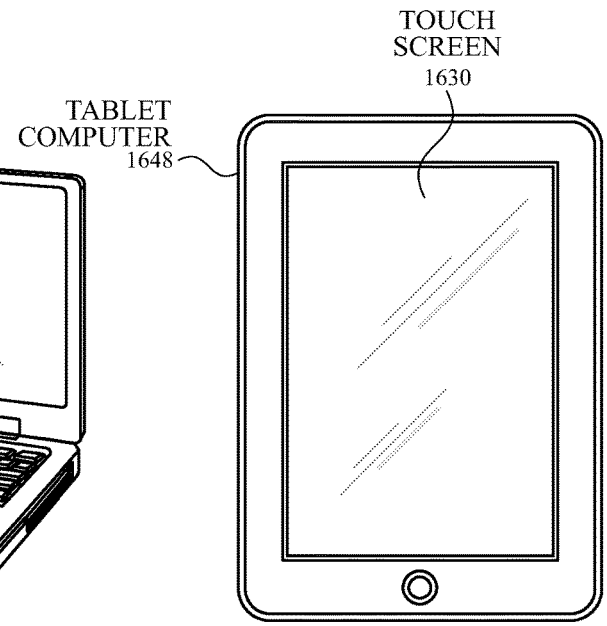

FIGS. 16A-16D illustrate example systems in which the multiple-bar sense electrode configurations for reducing wobble error (e.g., stylus tip wobble) according to examples of the disclosure can be implemented. FIG. 16A illustrates an example mobile telephone 1636 that includes a touch screen 1624 and other computing system blocks that can implement the multiple-bar sense electrode configurations for reducing wobble error according to various examples. FIG. 16B illustrates an example digital media player 1640 that includes a touch screen 1626 and other computing system blocks that can implement the multiple-bar sense electrode configurations for reducing wobble error according to various examples. FIG. 16C illustrates an example personal computer 1644 that includes a touch screen 1628 and other computing system blocks that can implement the multiple-bar sense electrode configurations for reducing wobble error according to various examples. FIG. 16D illustrates an example tablet computing device 1648 that includes a touch screen 1630 and other computing system blocks that can implement the multiple-bar sense electrode configurations for reducing wobble error according to various examples. The touch screen and computing system blocks that can implement the multiple-bar sense electrode configurations for reducing wobble error can be implemented in other devices including in wearable devices.

Thus, the examples of the disclosure provide various multiple-bar sense electrode configurations which make the signal profile associated with the sense electrode more linear, thus reducing stylus tip wobble and increasing touch sensor panel performance.

Some examples of the disclosure are related to touch sensor panel comprising: a first electrode including a first plurality of electrically connected bars extending in a first direction parallel to a length of the first electrode, wherein a first set of bars of the first plurality of bars are immediately adjacent to one another and are each separated from one another by a first distance, and a second set of bars of the first plurality of bars are immediately adjacent to one another and are each separated from one another by a second distance, greater than the first; and a second electrode, wherein the second electrode is separated from the first electrode by the first distance. Additionally or alternatively to one or more of the examples disclosed above, in some examples the second electrode has a second plurality of electrically connected bars, and a first edge bar in the first plurality of electrical connected bars in the first electrode is separated from a second edge bar in the second plurality of electrically connected bars by the first distance. Additionally or alternatively to one or more of the examples disclosed above, in some examples the first edge bar has a first width greater than the first distance. Additionally or alternatively to one or more of the examples disclosed above, in some examples the second electrode is the same shape as the first electrode. Additionally or alternatively to one or more of the examples disclosed above, in some examples the first plurality of electrically connected bars are connected at a first and second end of the electrode and separated along the length of the electrode between the first and second end of the touch sensor. Additionally or alternatively to one or more of the examples disclosed above, in some examples at least one of the first and second ends of the electrode are located in a bezel area of the touch sensor panel. Additionally or alternatively to one or more of the examples disclosed above, in some examples the first electrode is symmetric about a separation line between two of the first set of bars. Additionally or alternatively to one or more of the examples disclosed above, in some examples the first electrode and second electrode are symmetric to one another about a separation line between the first and second electrode. Additionally or alternatively to one or more of the examples disclosed above, in some examples a first bar is in both the first set of bars and the second set of bars. Additionally or alternatively to one or more of the examples disclosed above, in some examples the number of bars in the first set is two and the number of bars in the second set is two. Additionally or alternatively to one or more of the examples disclosed above, in some examples the first set of bars is positioned further from the second electrode than the second set of bars. Additionally or alternatively to one or more of the examples disclosed above, in some examples each of the bars in the first plurality of bars have a same width. Additionally or alternatively to one or more of the examples disclosed above, in some examples, the touch sensor panel further comprises: a plurality of dummy elements between two or more bars in the second set of bars in the first plurality of bars. Additionally or alternatively to one or more of the examples disclosed above, in some examples no dummy elements are positioned between any two of the first set of bars in the first plurality of bars. Additionally or alternatively to one or more of the examples disclosed above, in some examples the dummy elements each have a width equal to a width of each of the second set of bars in the first plurality of bars. Additionally or alternatively to one or more of the examples disclosed above, in some examples the dummy elements are separated from each other by the first distance. Additionally or alternatively to one or more of the examples disclosed above, in some examples: the first plurality of bars comprises a number of bars; the plurality of dummy elements comprises a number of dummy elements; a distance between any adjacent dummy element or bar is the same as the first distance; the first and second electrodes each have a same pitch; and the dummy elements and the first plurality of bars all have a same width; and the width is governed by the pitch, number of bars, number of dummy elements, and first distance.

Some examples of the disclosure are related to touch sensor panel comprising: a first electrode including: a first bar extending in a first direction parallel to a length of the first electrode and having a first width; a second bar electrically connected to the first bar, parallel to the first bar, and having the first width; a first set of projections, each having an L shape and extending from the first bar; a second electrode including a second set of projections, each having an L shape and; wherein the first set of projections and the second set of projections interleave. Additionally or alternatively to one or more of the examples disclosed above, in some examples each of the first set of projections has a horizontal portion and a vertical portion, and wherein the vertical portion of each of the first set of projections has a second width different from the first width. Additionally or alternatively to one or more of the examples disclosed above, in some examples, the touch sensor panel further comprises:: a third set of projections, each having an L shape in a same orientation as each of the first set of projections, wherein each of the third set of projections is connected to a corresponding projection of the first set of projections and is located further from the first bar than each of the first set of projections; each of the third set of projections has an L shape in a same orientation as each of the first set of projections. Additionally or alternatively to one or more of the examples disclosed above, in some examples: a distance across the first electrode in a second direction perpendicular to the first direction is greater than a pitch of the touch sensor panel.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A touch sensor panel comprising:
a first electrode including a first plurality of electrically connected bars extending in a first direction parallel to a length of the first electrode, wherein
a first set of bars of the first plurality of bars are immediately adjacent to one another and are each separated from one another by a first distance, and
a second set of bars of the first plurality of bars are immediately adjacent to one another and are each separated from one another by a second distance, greater than the first; and a second electrode including a second plurality of electrically connected bars extending in the first direction parallel to the length of the first electrode, wherein:
a third set of bars of the second plurality of bars are immediately adjacent to one another and are each separated from one another by the first distance;
a fourth set of bars of the second plurality of bars are immediately adjacent to one another and are each separated from one another by the second distance, greater than the first distance; and
the second electrode is separated from the first electrode by the first distance, wherein all bars of the first electrode extending in the direction parallel to the length of the first electrode have a width equal to a common width.

2. The touch sensor panel of claim 1, wherein
the second electrode has a second plurality of electrically connected bars, and
a first edge bar in the first plurality of electrical connected bars in the first electrode is separated from a second edge bar in the second plurality of electrically connected bars by the first distance.

3. The touch sensor panel of claim 2, wherein the first edge bar has a first width greater than the first distance.

4. The touch sensor panel of claim 1, wherein the second electrode is a same shape as the first electrode.

5. The touch sensor panel of claim 1, wherein
the first plurality of electrically connected bars are connected at a first and second end of the electrode and separated along the length of the electrode between the first and second end of the touch sensor.

6. The touch sensor panel of claim 5, wherein at least one of the first and second ends of the electrode are located in a bezel area of the touch sensor panel.

7. The touch sensor panel of claim 1, wherein the first electrode is symmetric about a separation line between two of the first set of bars.

8. The touch sensor panel of claim 1, wherein the first electrode and second electrode are symmetric to one another about a separation line between the first and second electrode.

9. The touch sensor panel of claim 1, wherein a first bar is in both the first set of bars and the second set of bars.

10. The touch sensor panel of claim 9, wherein a number of bars in the first set is two and a number of bars in the second set is two.

11. The touch sensor panel of claim 1, wherein the first set of bars is positioned further from the second electrode than the second set of bars.

12. The touch sensor panel of claim 1, wherein each of the bars in the second plurality of bars have a width equal to the common width.

13. The touch sensor panel of claim 1 further comprising a plurality of dummy elements between two or more bars in the second set of bars in the first plurality of bars.

14. The touch sensor panel of claim 13, wherein no dummy elements are positioned between any two bars of the first set of bars in the first plurality of bars.

15. The touch sensor panel of claim 13, wherein the dummy elements each have a width equal to a width of each of the second set of bars in the first plurality of bars.

16. The touch sensor panel of claim 13, wherein the dummy elements are separated from each other by the first distance.

17. The touch sensor panel of claim 13, wherein:
the first plurality of bars comprises a number of bars;

the plurality of dummy elements comprises a number of dummy elements;

a distance between any adjacent dummy element or bar is the same as the first distance;

the first and second electrodes each have a same pitch; and the dummy elements and the first plurality of bars all have a same width; and the width is governed by the pitch, number of bars, number of dummy elements, and first distance.

18. The touch sensor panel of claim 1, wherein the first plurality of bars are connected at a first distal end by a metal bar extending in a second direction perpendicular to the length of the first electrode.

19. The touch sensor panel of claim 18, wherein the first plurality of bars and the metal bar are formed from a single conductor.

* * * * *